(12) United States Patent
Park et al.

(10) Patent No.: US 12,133,214 B2
(45) Date of Patent: Oct. 29, 2024

(54) METHOD FOR PERFORMING UPLINK TRANSMISSION AND RECEPTION IN WIRELESS COMMUNICATION SYSTEM, AND DEVICE THEREFOR

(71) Applicant: LG ELECTRONICS INC., Seoul (KR)

(72) Inventors: Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 636 days.

(21) Appl. No.: 17/278,640

(22) PCT Filed: Sep. 20, 2019

(86) PCT No.: PCT/KR2019/012304
§ 371 (c)(1),
(2) Date: Mar. 22, 2021

(87) PCT Pub. No.: WO2020/060340
PCT Pub. Date: Mar. 26, 2020

(65) Prior Publication Data
US 2022/0039122 A1 Feb. 3, 2022

(30) Foreign Application Priority Data
Sep. 21, 2018 (KR) .......................... 10-2018-0114472

(51) Int. Cl.
*H04W 72/12* (2023.01)
*H04L 1/18* (2023.01)
(Continued)

(52) U.S. Cl.
CPC ....... *H04W 72/1268* (2013.01); *H04L 1/1819* (2013.01); *H04L 5/0051* (2013.01);
(Continued)

(58) Field of Classification Search
CPC . H04W 72/566; H04W 72/23; H04W 72/046; H04W 72/1268; H04W 74/0841; H04L 1/1819; H04L 5/0051; H04L 5/0053
See application file for complete search history.

(56) References Cited

U.S. PATENT DOCUMENTS

2014/0016475 A1 * 1/2014 Zhou .................. H04W 72/569
370/236
2016/0164588 A1 6/2016 Chen
(Continued)

FOREIGN PATENT DOCUMENTS

CA 2844263 A1 * 2/2013 ........... H04B 7/2603
CA 3057343 C * 5/2022 ........... H04B 7/0404
(Continued)

OTHER PUBLICATIONS

PCT International Application No. PCT/KR2019/012304, International Search Report dated Jan. 17, 2020, 5 pages.

*Primary Examiner* — Phong La
(74) *Attorney, Agent, or Firm* — LEE, HONG, DEGERMAN, KANG & WAIMEY

(57) ABSTRACT

The present specification relates to a method for performing uplink transmission and reception in a wireless communication system. More particularly, a method by which a terminal supporting a plurality of panels performs an uplink transmission in a wireless communication system comprises the steps of: receiving, from a base station, configuration information related to the uplink transmission, wherein the configuration information is set on the basis of a first panel type and a second panel type related to the uplink transmission; and performing the uplink transmission by means of a panel corresponding to the first panel type and/or the second panel type, wherein priority of the first panel type can be set to be higher than that of the second panel type.

9 Claims, 27 Drawing Sheets

(51) Int. Cl.
  *H04L 1/1812*    (2023.01)
  *H04L 5/00*      (2006.01)
  *H04W 72/04*     (2023.01)
  *H04W 72/044*    (2023.01)
  *H04W 72/1268*   (2023.01)
  *H04W 72/23*     (2023.01)
  *H04W 72/566*    (2023.01)
  *H04W 74/08*     (2024.01)
  *H04W 74/0833*   (2024.01)

(52) U.S. Cl.
  CPC ......... *H04L 5/0053* (2013.01); *H04W 72/046* (2013.01); *H04W 72/23* (2023.01); *H04W 72/566* (2023.01); *H04W 74/0841* (2013.01)

(56) References Cited

U.S. PATENT DOCUMENTS

| | | | |
|---|---|---|---|
| 2018/0062801 A1* | 3/2018 | Zhang | H04J 11/0053 |
| 2019/0159136 A1* | 5/2019 | MolavianJazi | H04W 52/362 |
| 2019/0174527 A1* | 6/2019 | Park | H04L 25/0224 |
| 2020/0077351 A1* | 3/2020 | Porat | H04W 56/0015 |
| 2022/0039122 A1* | 2/2022 | Park | H04W 72/1268 |

FOREIGN PATENT DOCUMENTS

| | | | | |
|---|---|---|---|---|
| CA | 2931656 C | * | 7/2022 | ........... H04L 1/1861 |
| CN | 3056688 | * | 3/2017 | |
| CN | 107889247 A | * | 4/2018 | ........... H04B 7/0417 |
| CN | 109802801 | * | 5/2019 | ........... H04L 5/0091 |
| CN | 109802801 A | * | 5/2019 | ............... H04B 7/06 |
| KR | 1020160058716 | | 11/2016 | |
| KR | 1020160131519 | | 11/2016 | |
| KR | 1020180000950 | | 1/2018 | |
| WO | 2017192889 | | 11/2017 | |

* cited by examiner

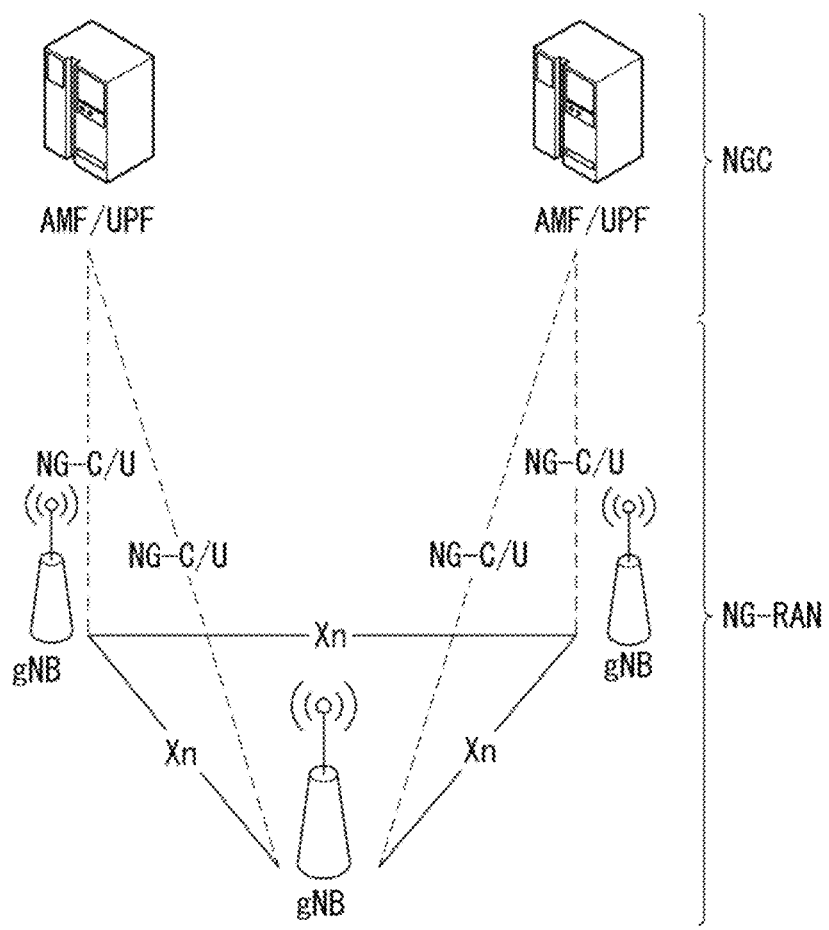
[FIG. 1]

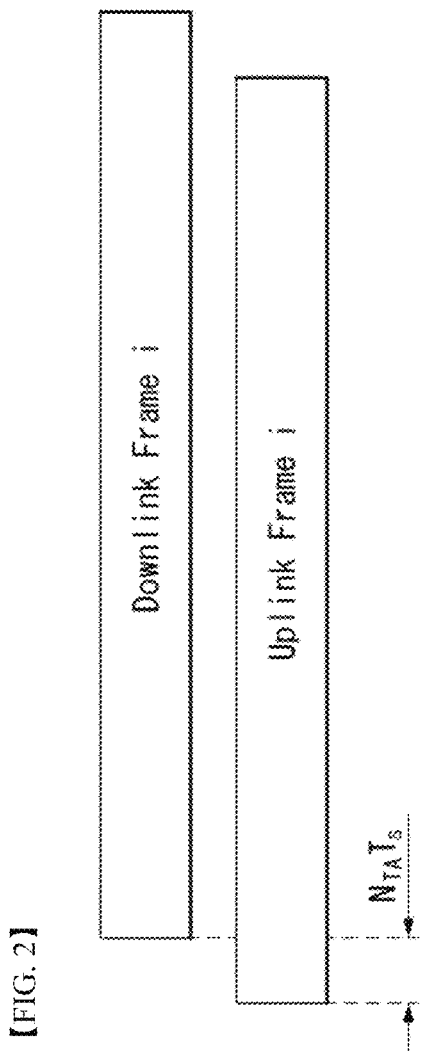
[FIG. 2]

[FIG. 3]
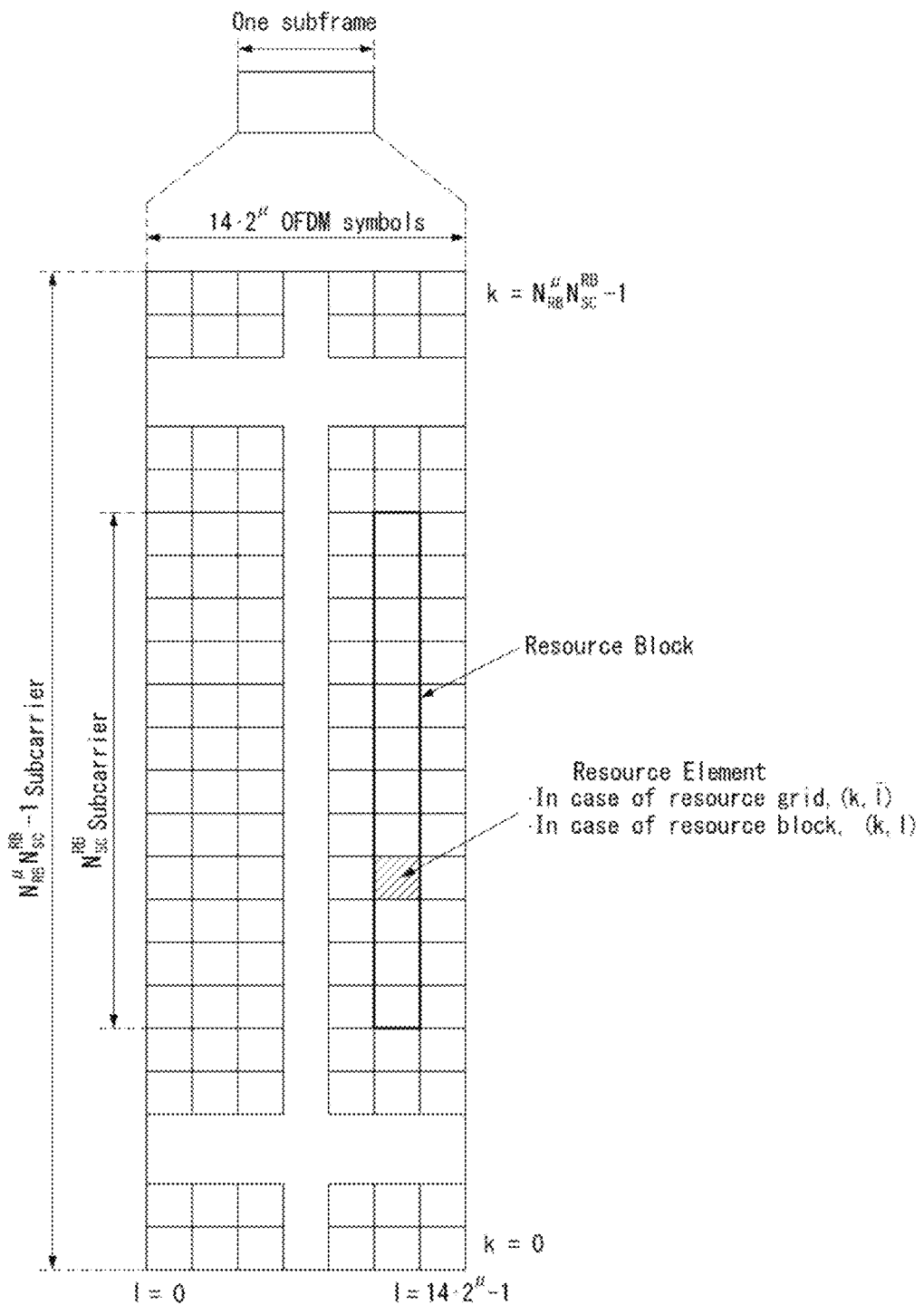

[FIG. 4]
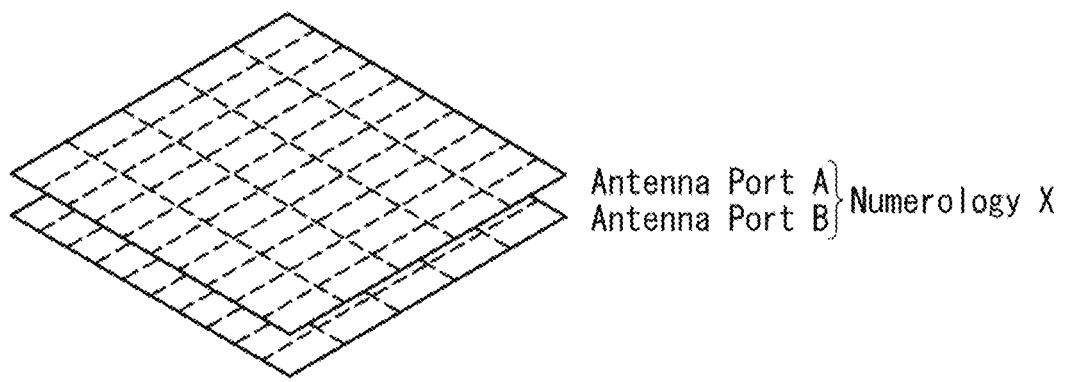
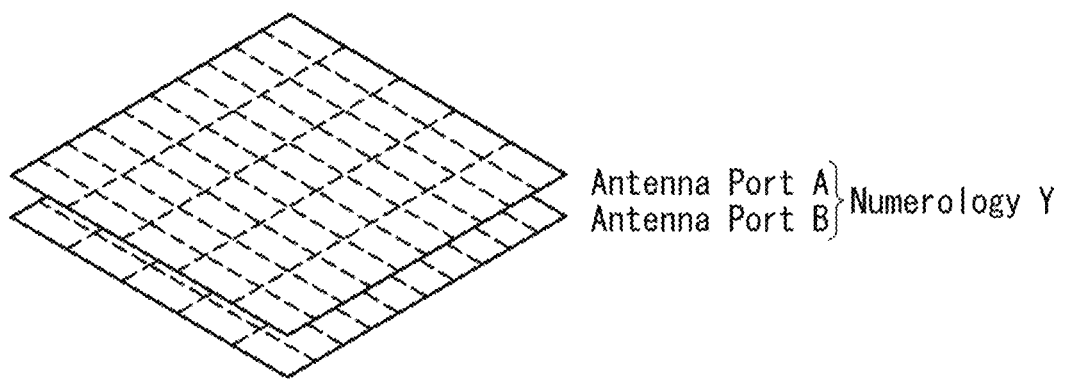

[FIG. 5]
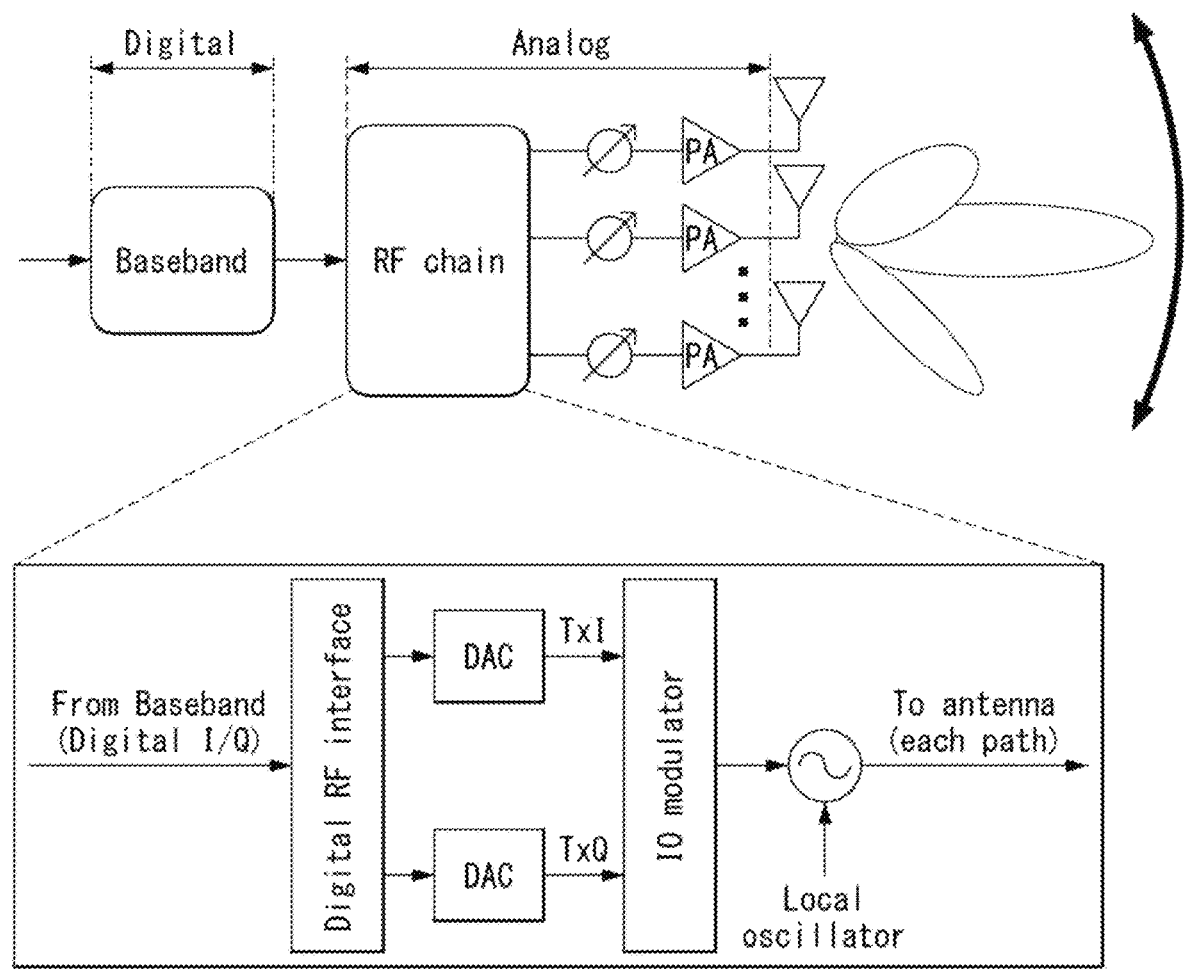

[FIG. 6]
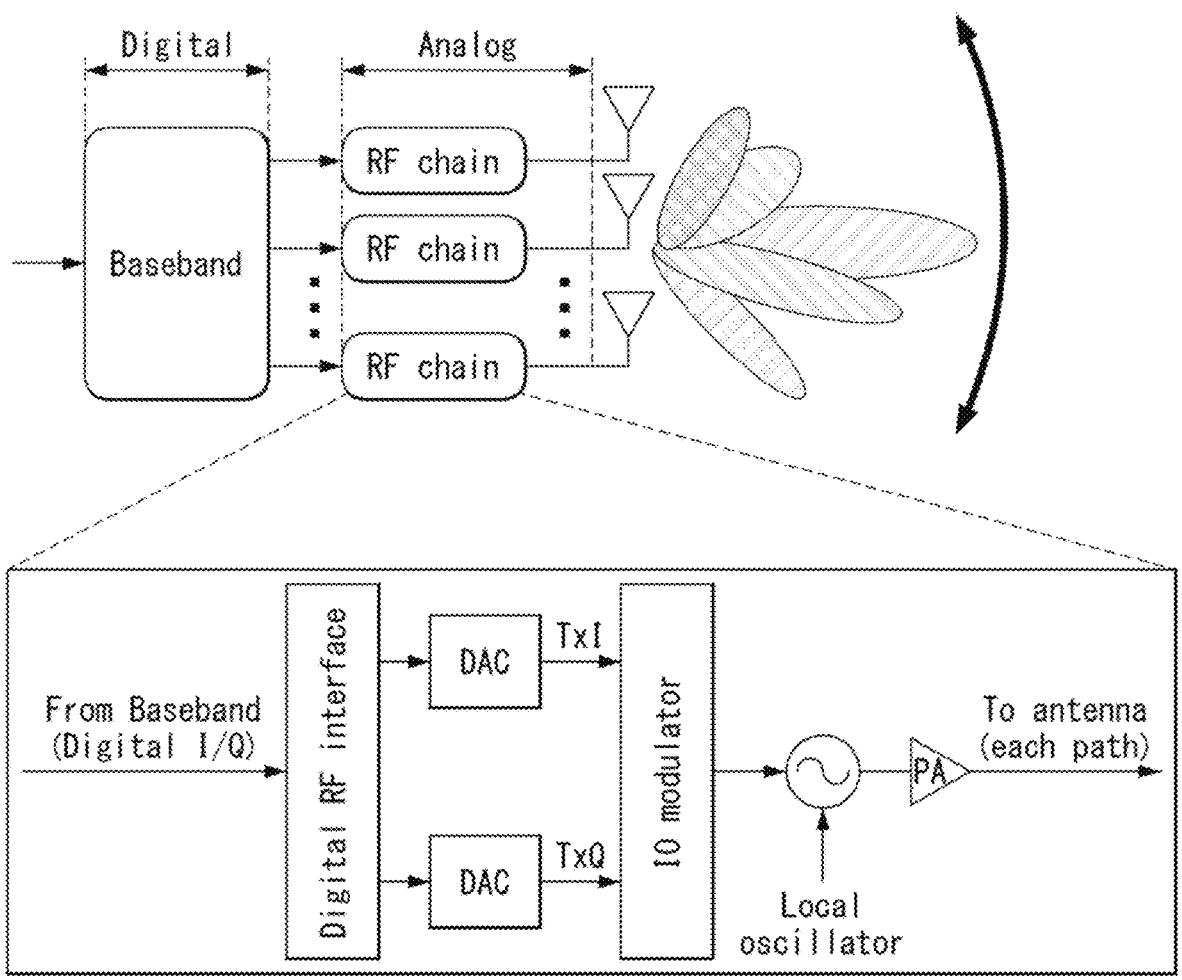

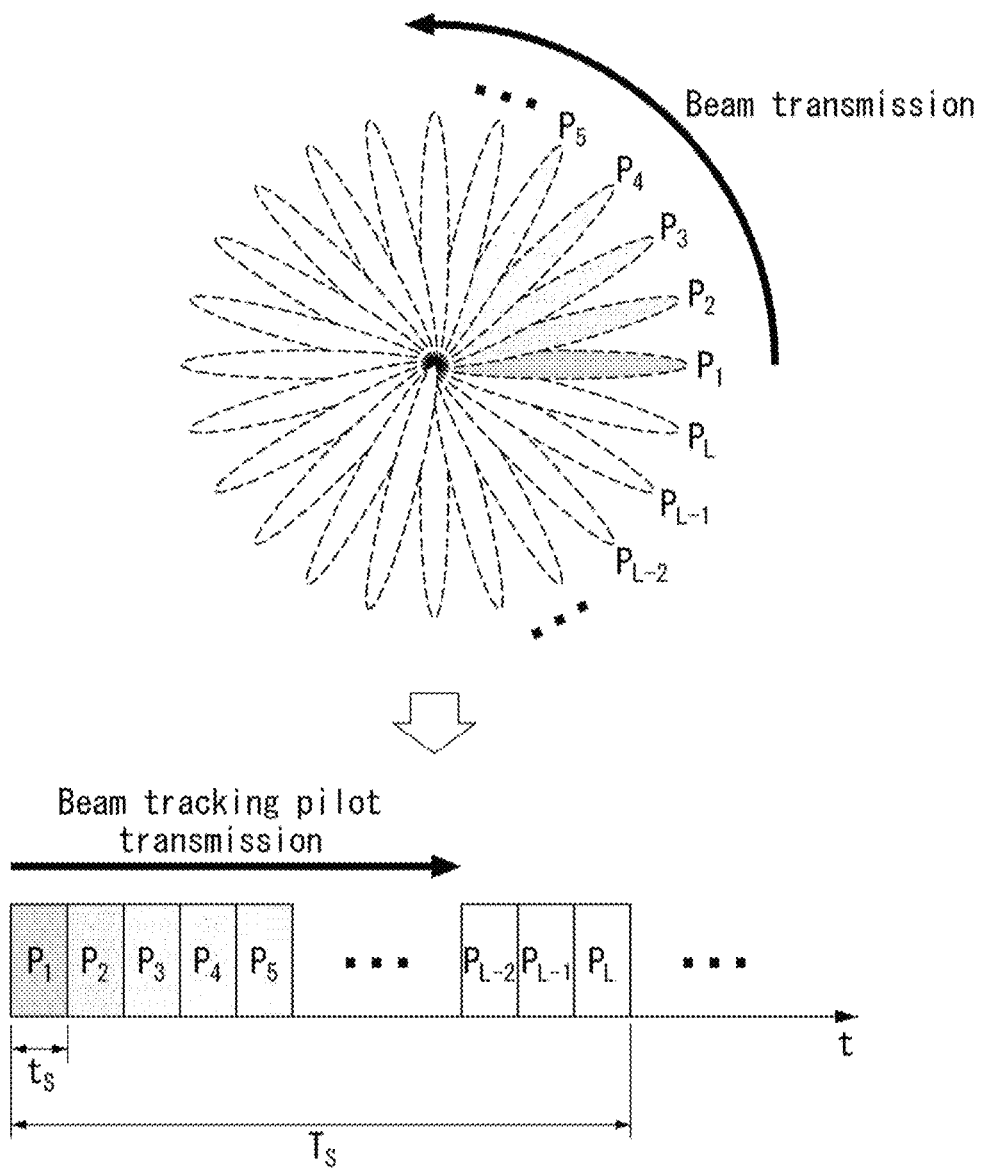
[FIG. 7]

[FIG. 8]
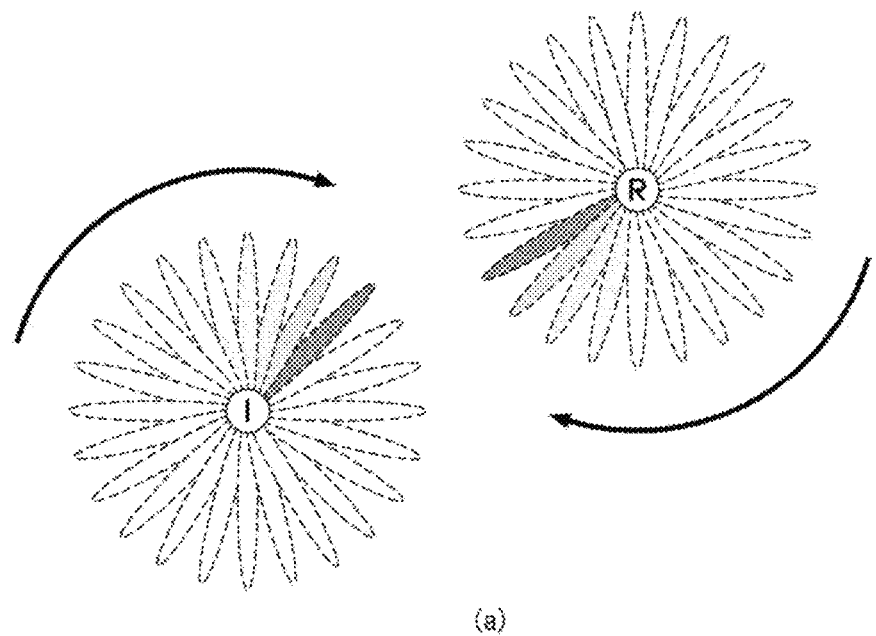
(a)
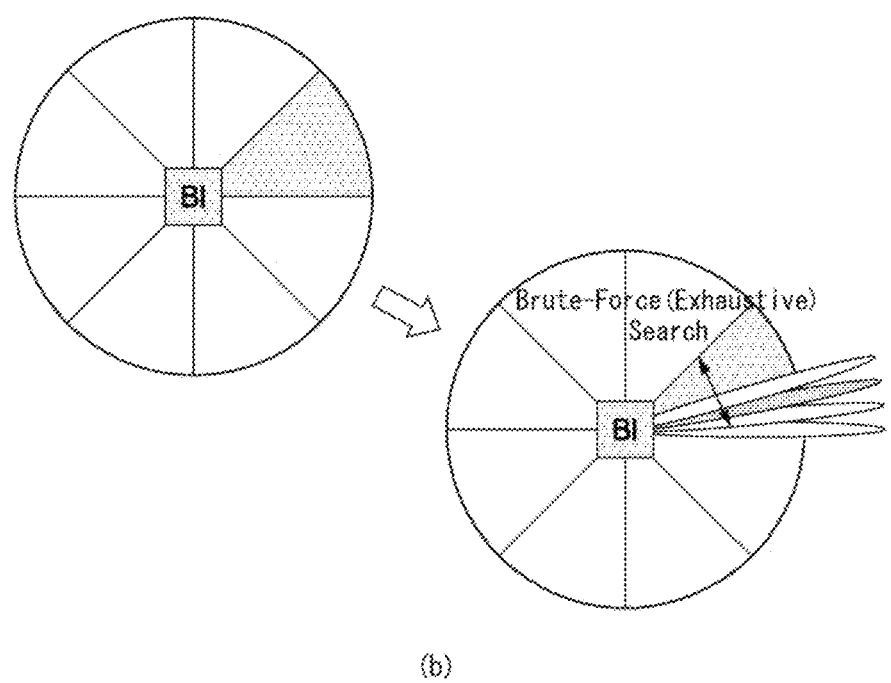
(b)

[FIG. 9]

(a) Starting OFDM symbol is '0'

(b) Starting OFDM symbol is '2'

[FIG. 10]
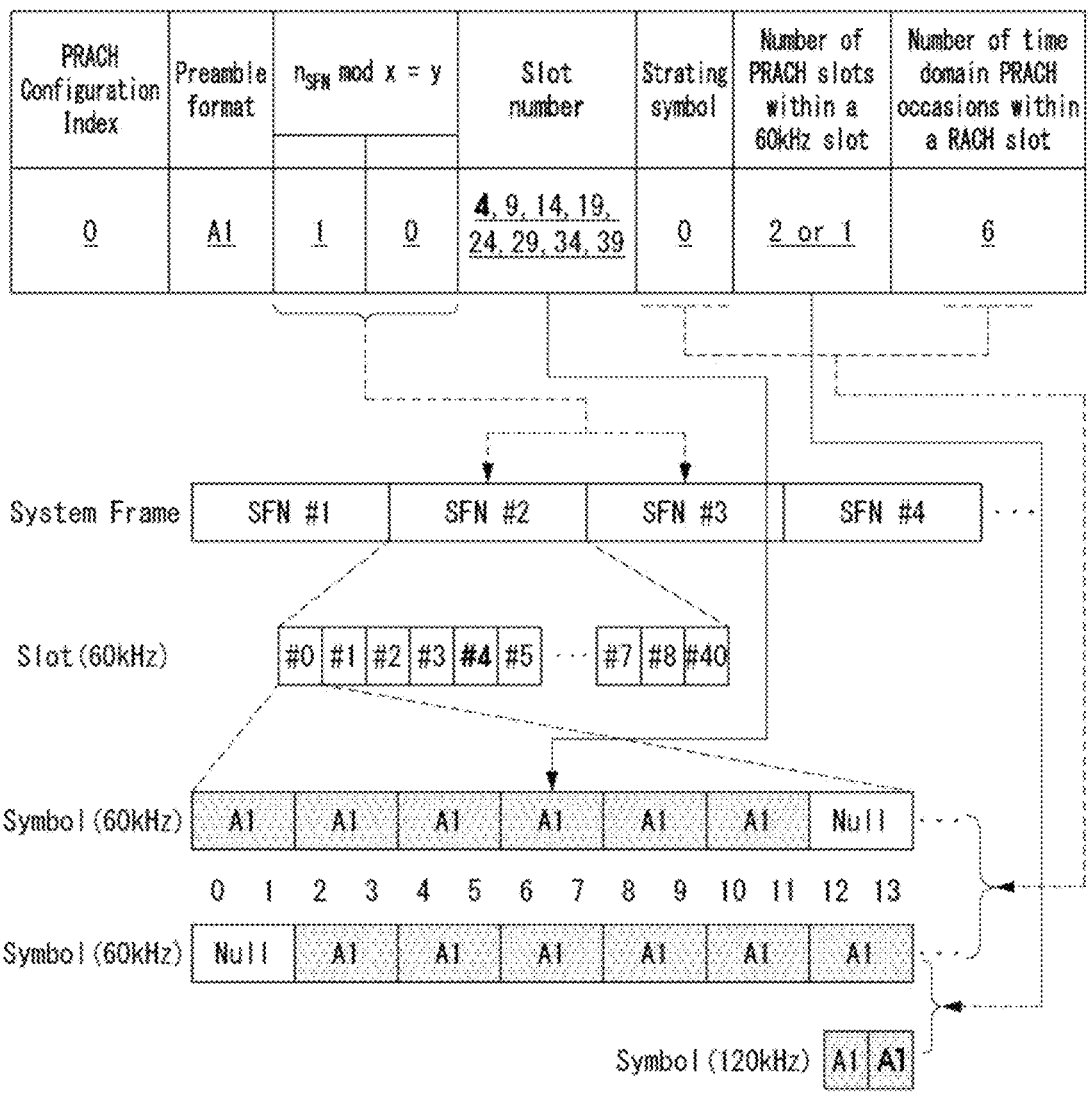

[FIG. 11]
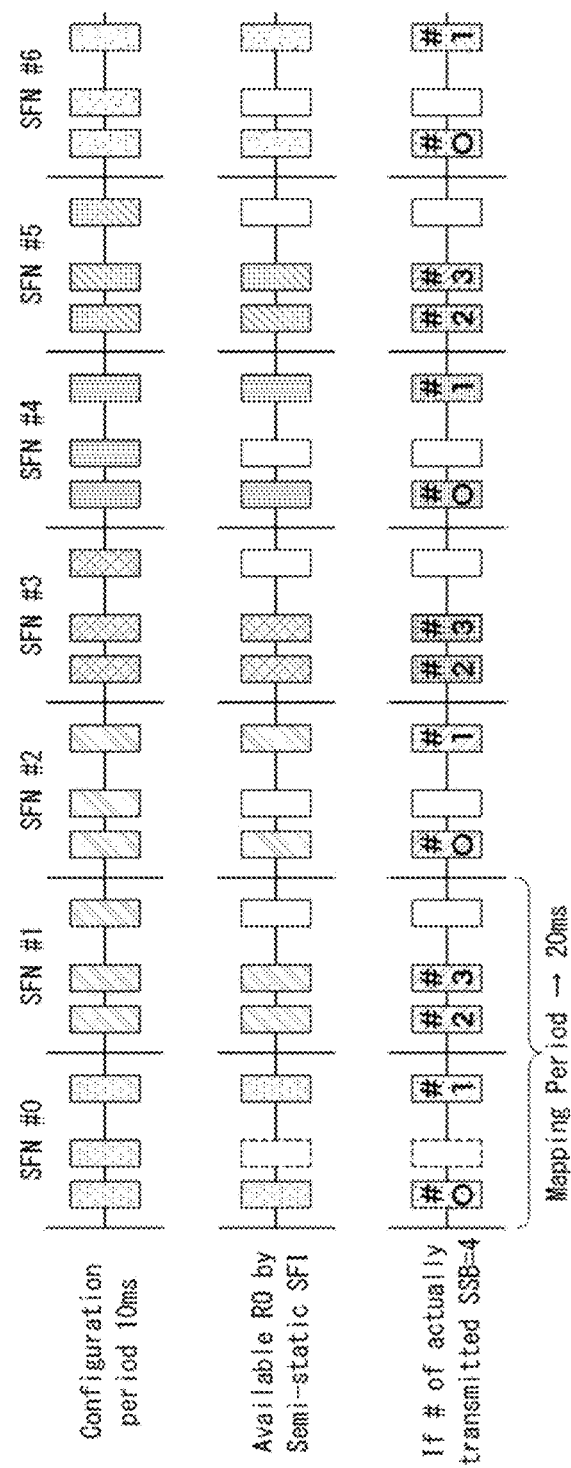

[FIG. 12]
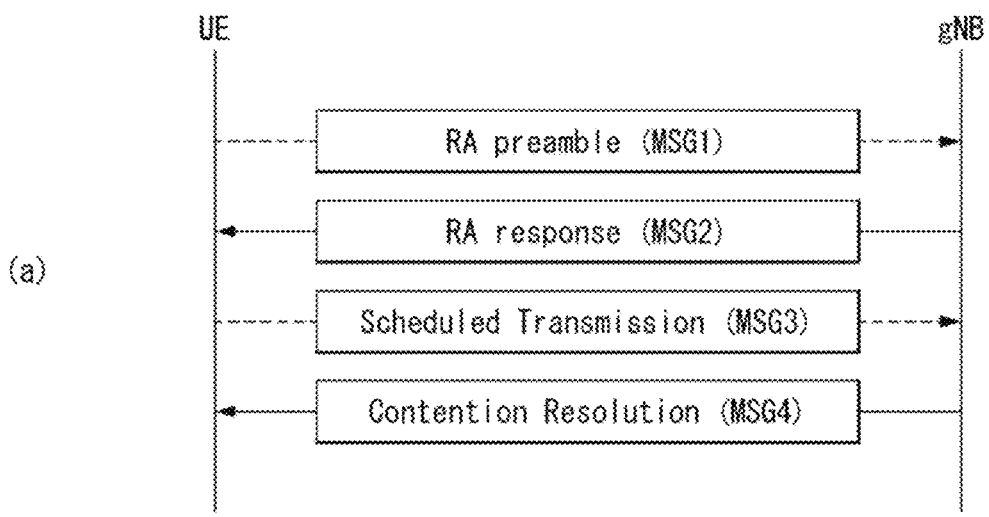
(a) Contention based
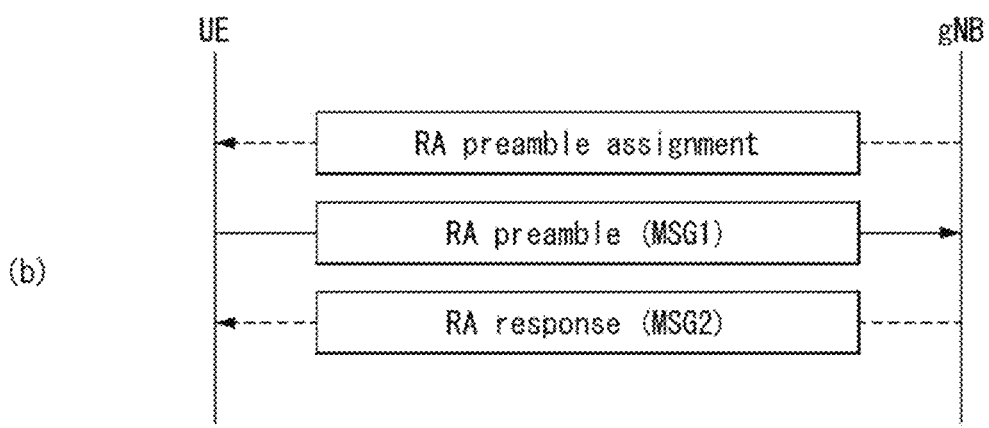
(b) Contention-free

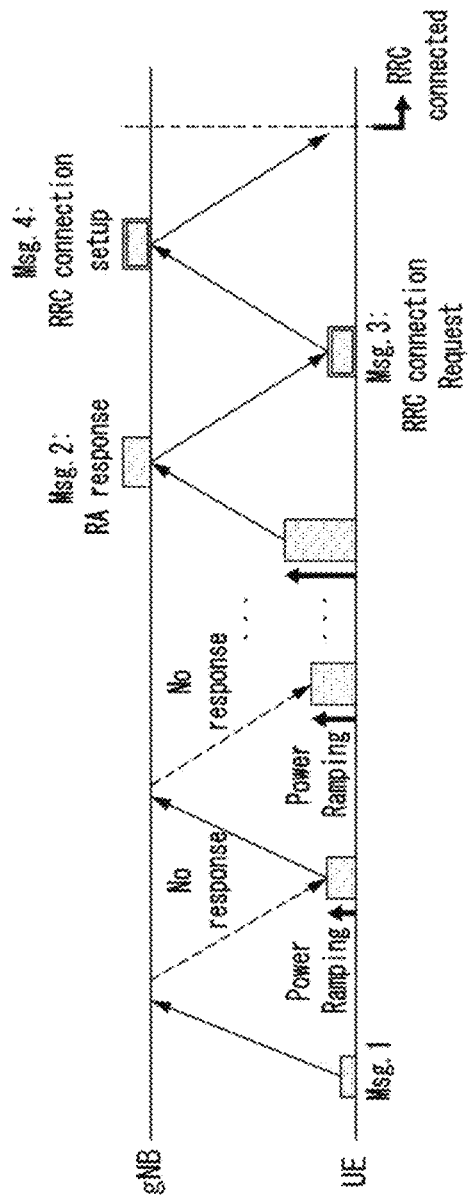
[FIG. 13]

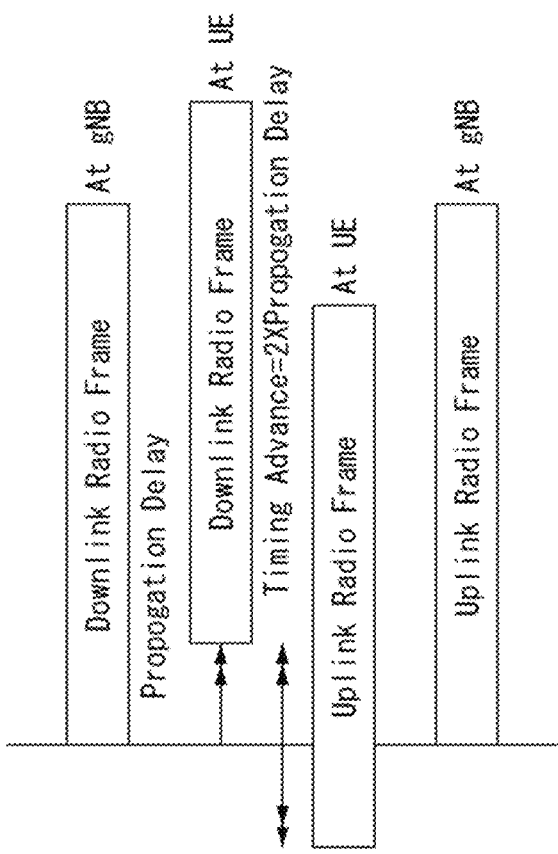
[FIG. 14]

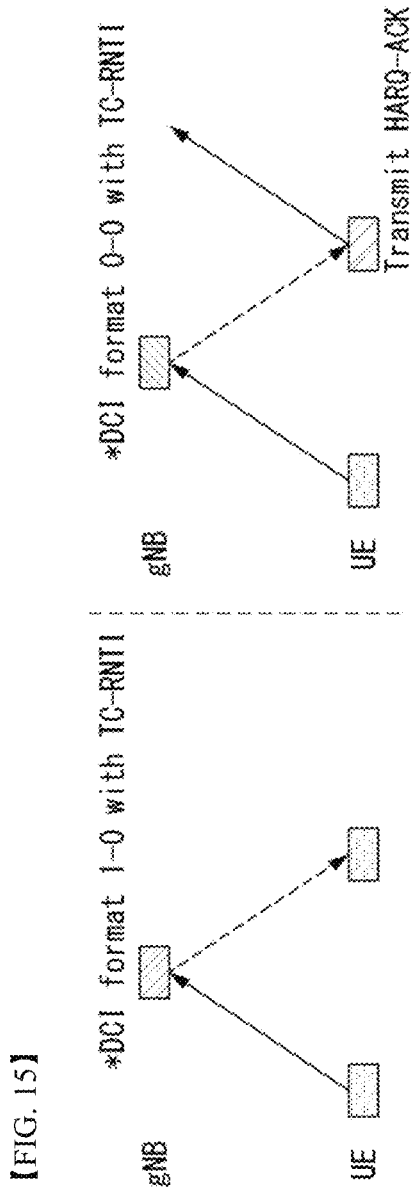
[FIG. 15]

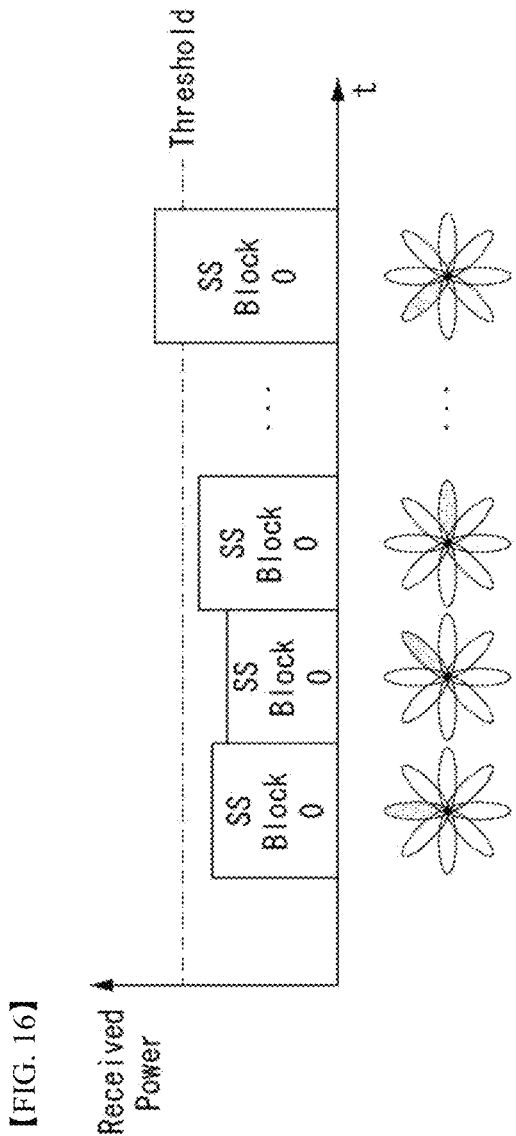

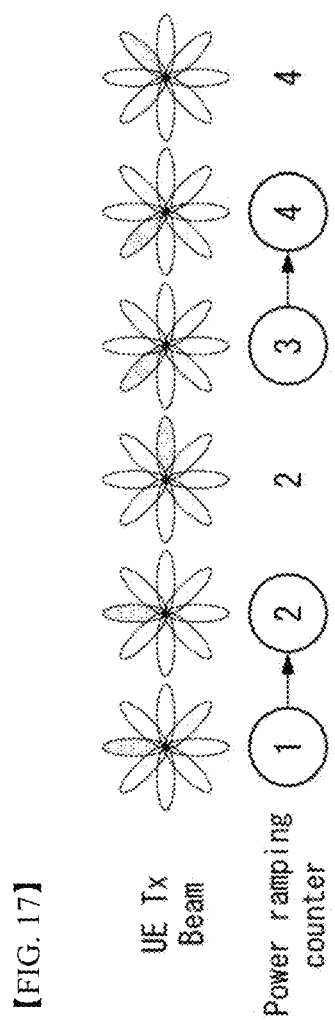
[FIG. 17]

[FIG. 18]
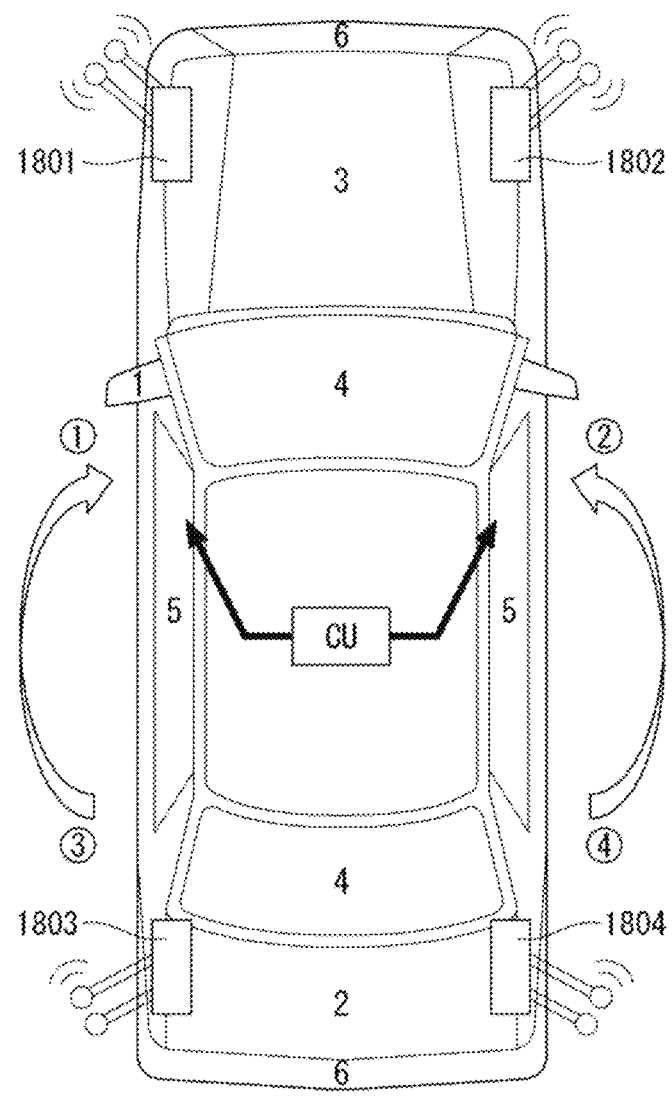

[FIG. 19]
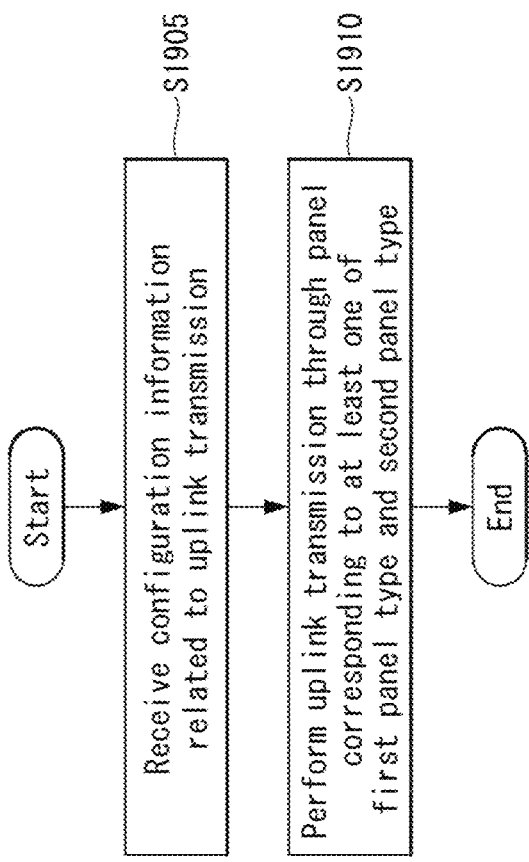

[FIG. 20]
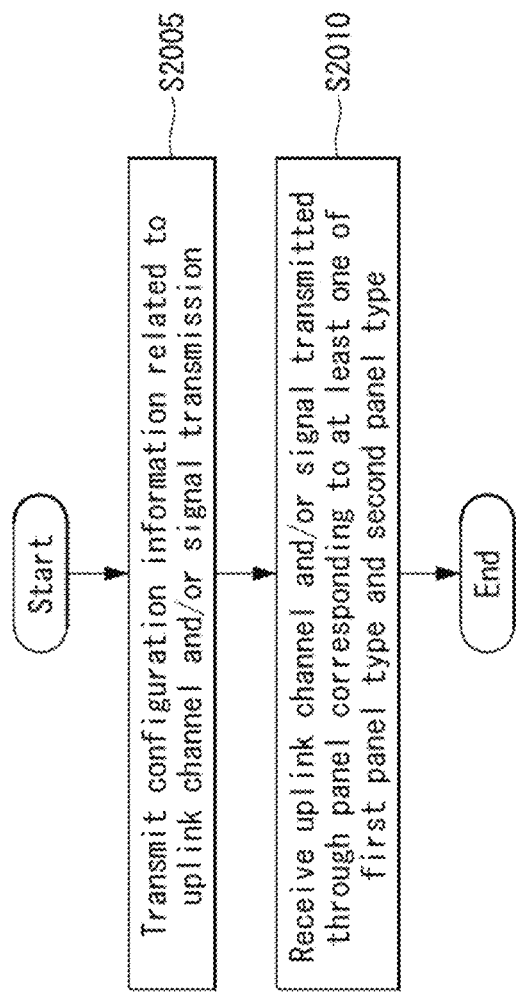

[FIG. 21]
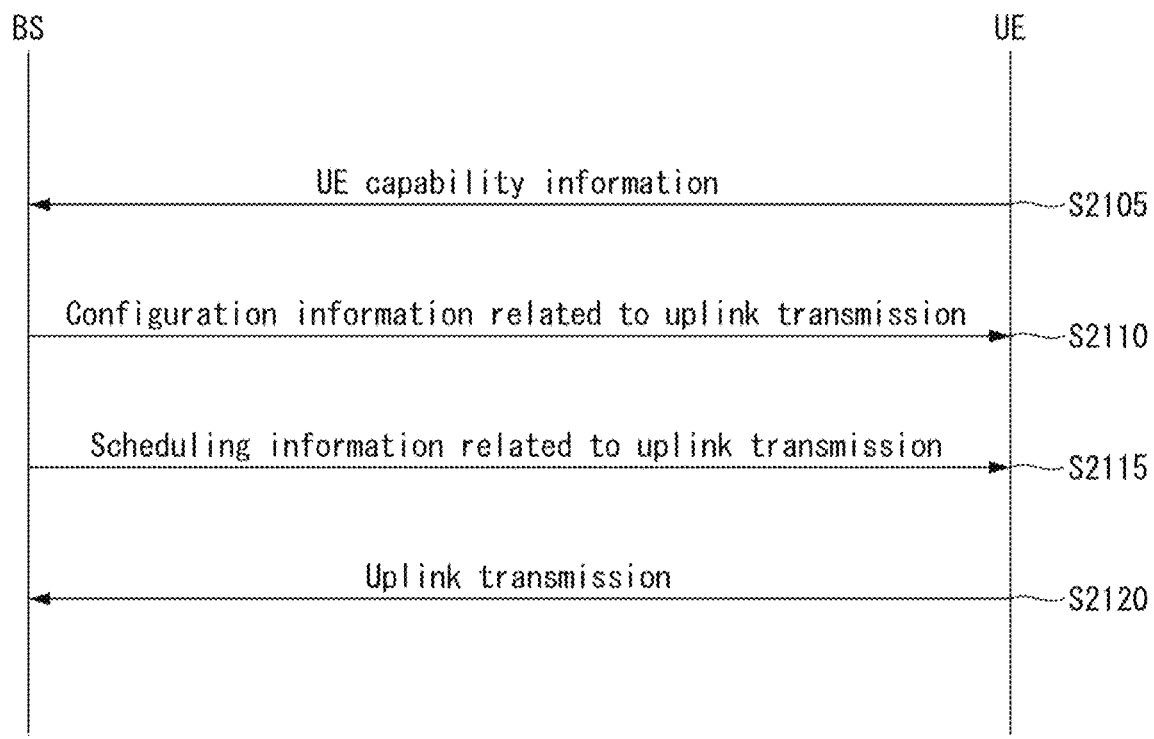

[FIG. 22]
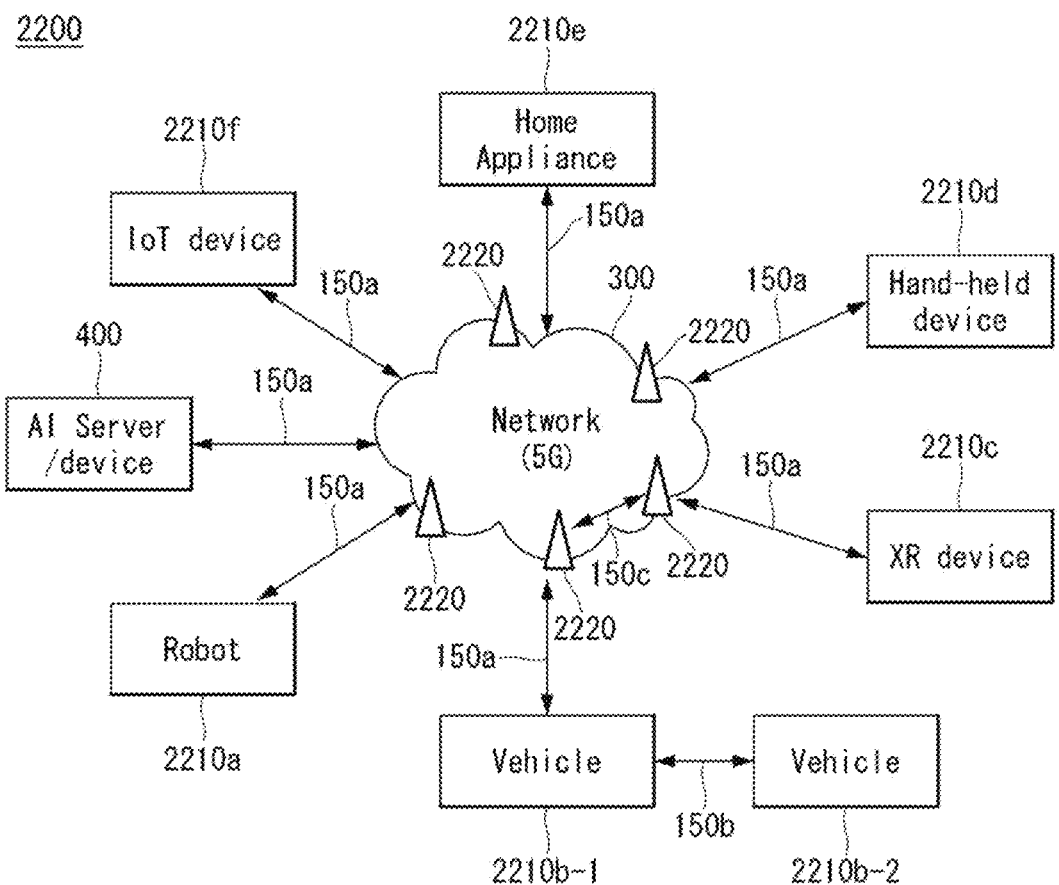

[FIG. 23]
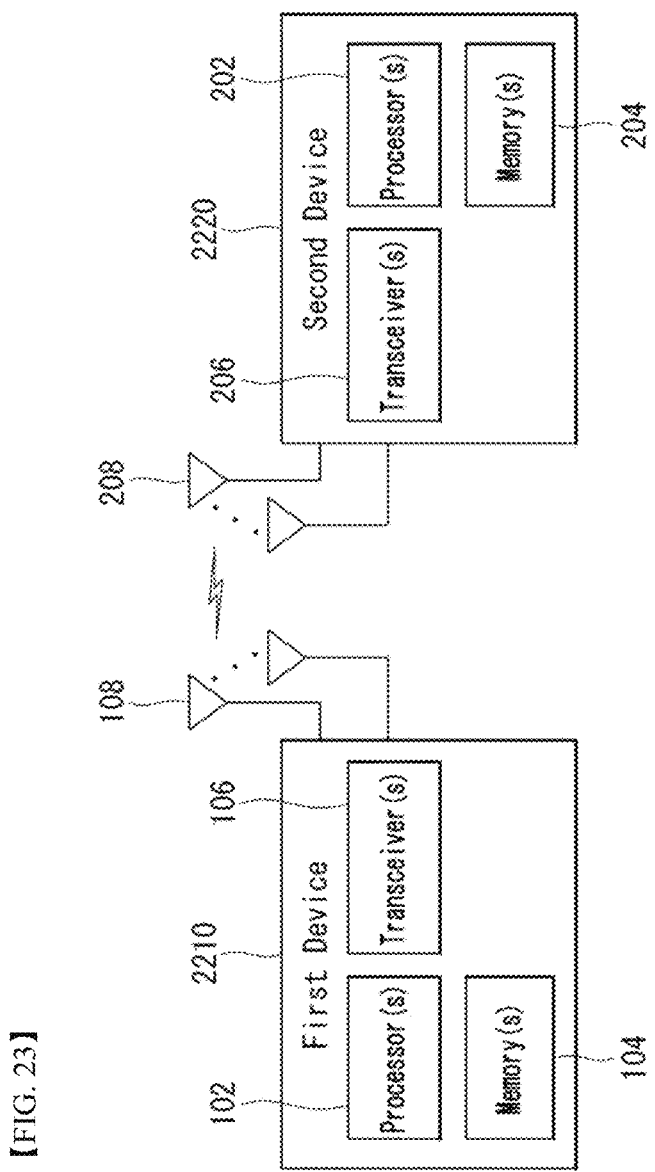

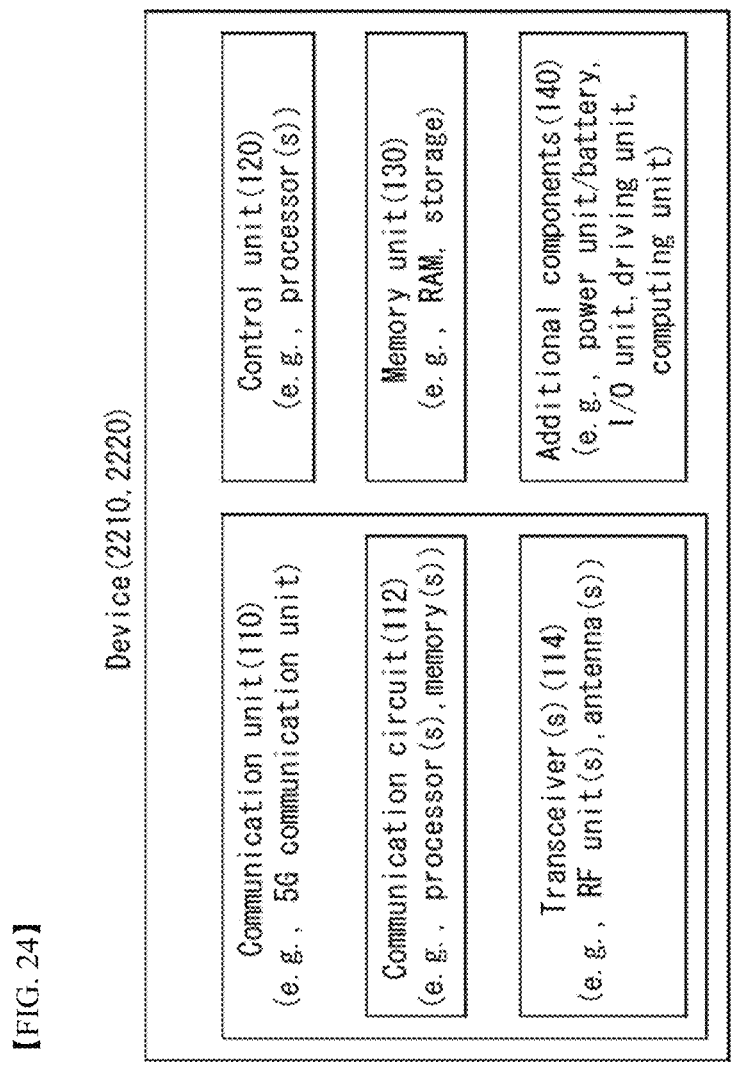
[FIG. 24]

[FIG. 25]
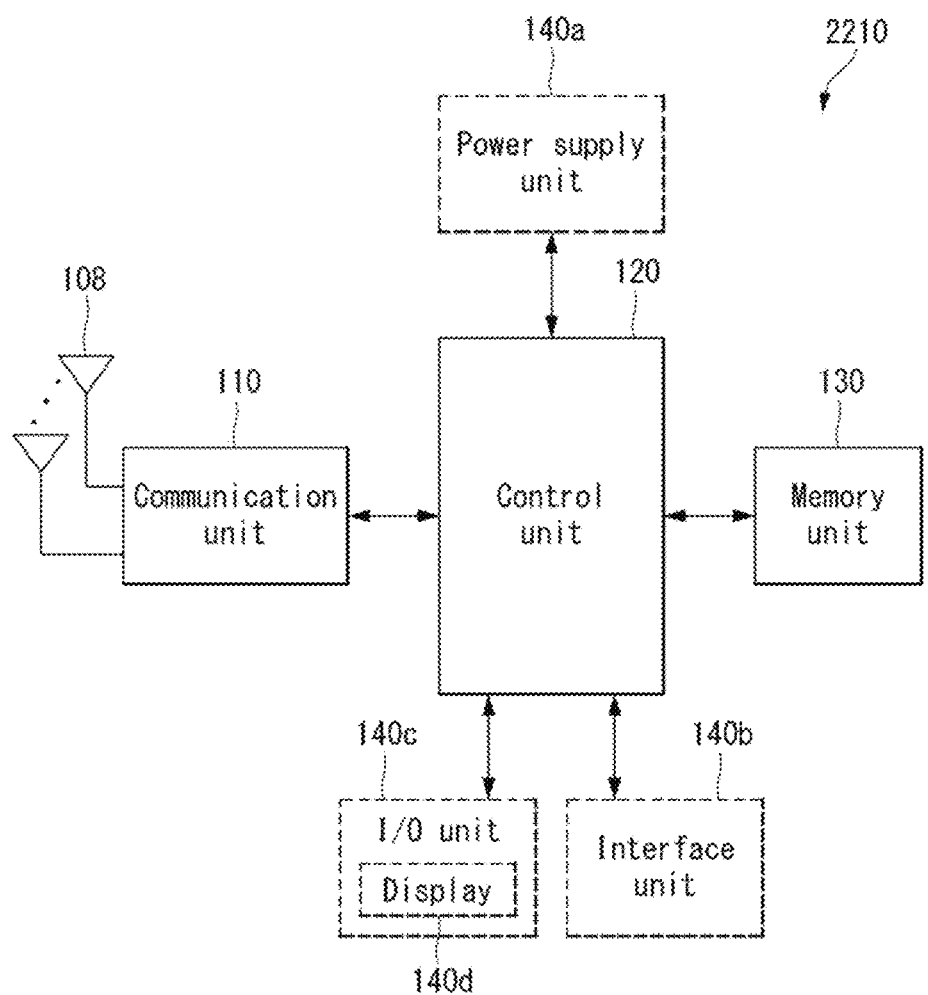

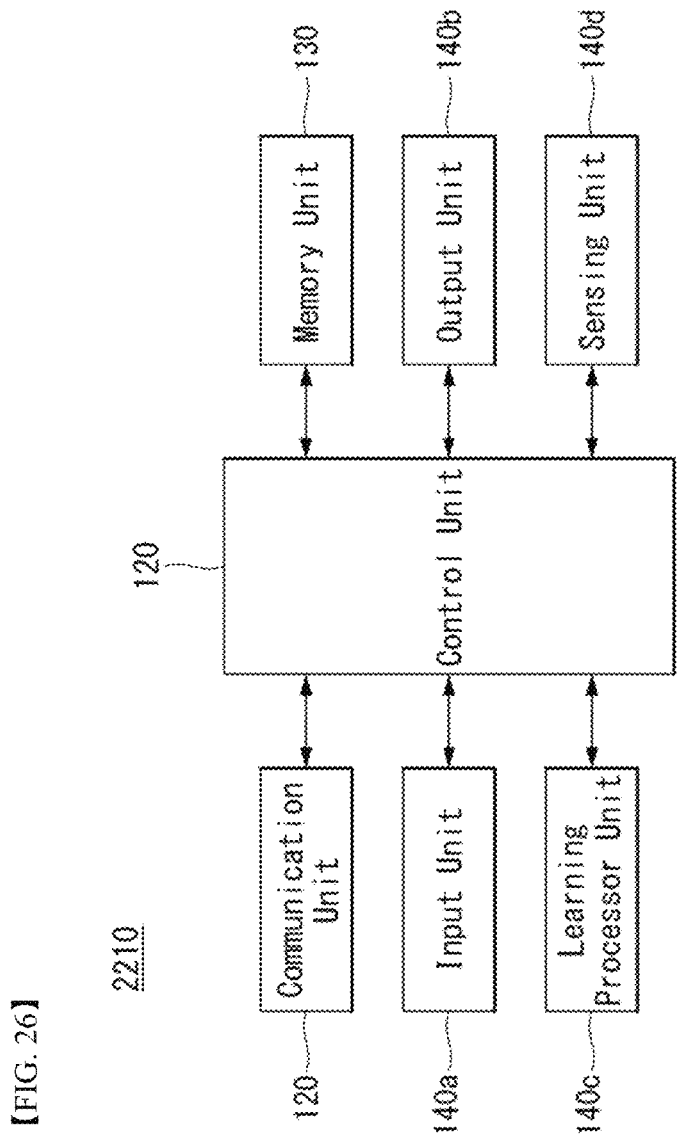
[FIG. 26]

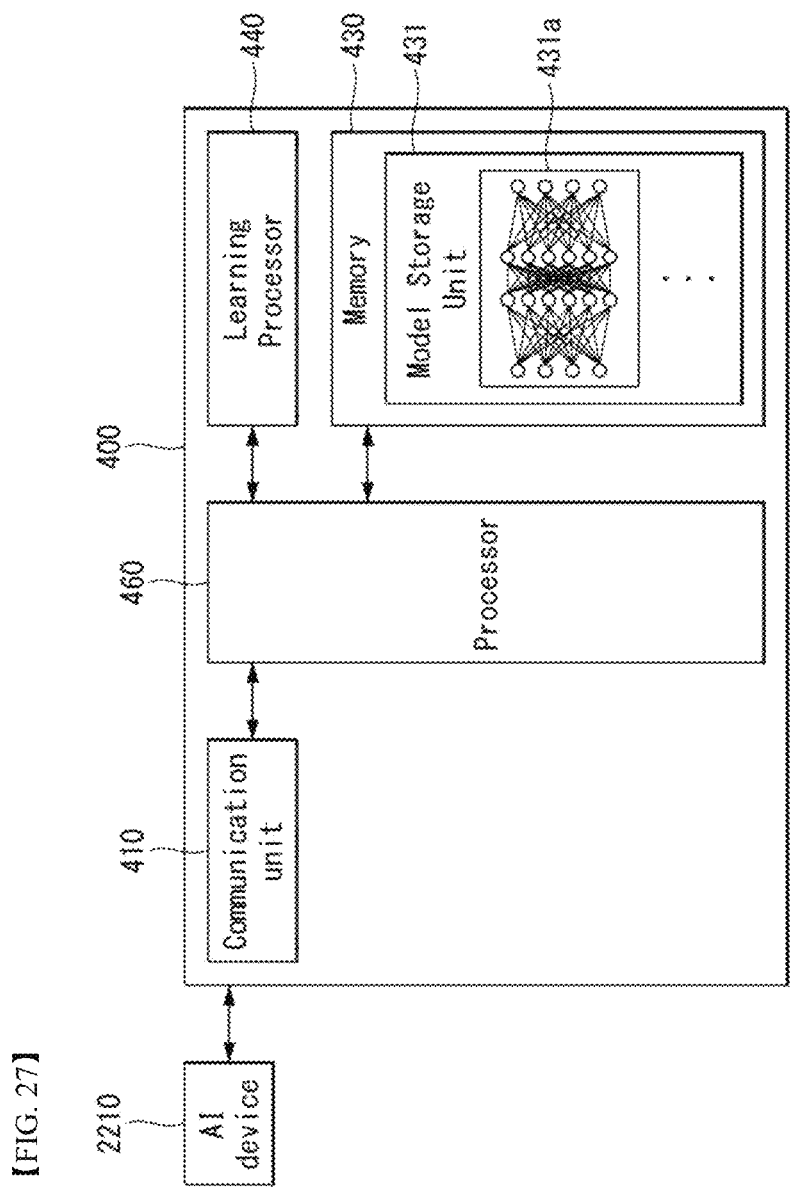
[FIG. 27]

METHOD FOR PERFORMING UPLINK TRANSMISSION AND RECEPTION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/012304, filed on Sep. 20, 2019, which claims the benefit of earlier filing date and right of priority to Korean Application No. 10-2018-0114472 filed on Sep. 21, 2018, the contents of which are all hereby incorporated by reference herein in their entirety.

TECHNICAL FIELD

The present disclosure relates to a wireless communication system and, more specifically, to a method for performing uplink transmission and reception and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

An object of the present disclosure is to provide a method of performing uplink transmission by considering a transmission unit (e.g., an uplink synchronization unit (USU), a panel, a beam group, or an antenna group, etc.).

Technical problems to be solved by the present disclosure are not limited by the aforementioned technical problems, and other technical problems which are not mentioned above can be clearly understood from the following description by those skilled in the art to which the present disclosure pertains.

Technical Solution

A method for performing uplink transmission by a UE supporting multiple panels in a wireless communication system according to an embodiment of the present disclosure may include: receiving, from a base station (B S), configuration information related to the uplink transmission, the configuration information being configured based on a first panel type and a second panel type related to the uplink transmission; and performing the uplink transmission through a panel corresponding to at least one of the first panel type and the second panel type, priority of the first panel type being set to be higher than priority of the second panel type.

Furthermore, in the method according to an embodiment of the present disclosure, the panel used for the uplink transmission may belong to the first panel type or the second panel type based on usage of the uplink transmission.

Furthermore, in the method according to an embodiment of the present disclosure, the panel may belong to the first panel type when the uplink transmission is sounding reference signal (SRS) transmission for beam management.

Furthermore, in the method according to an embodiment of the present disclosure, the first panel type may be configured for at least one of a physical random access channel (PRACH), a physical uplink control channel (PUCCH), a physical uplink shared channel (PUSCH), and a sounding reference signal (SRS), and the second panel type may be configured for at least one of the PUCCH, the PUSCH and the SRS.

Furthermore, in the method according to an embodiment of the present disclosure, the panel may belong to the first panel type when the uplink transmission is PUCCH transmission for transmission of a scheduling request (SR) or HARQ-ACK information.

Furthermore, in the method according to an embodiment of the present disclosure, the panel may belong to the first panel type when the uplink transmission is PUSCH transmission for retransmission of uplink transmission previously performed by the UE.

Furthermore, in the method according to an embodiment of the present disclosure, when the uplink transmission is joint transmission for multiple BSs, the first panel type may be a preset default panel type for the joint transmission.

Furthermore, the method according to an embodiment of the present disclosure may further include receiving scheduling information for the uplink transmission through one of downlink control information (DCI) and a medium access control-control element (MAC-CE), wherein the scheduling information may include information indicating one of the first panel type and the second panel type to be applied to the uplink transmission.

A UE performing uplink transmission in a wireless communication system according to an embodiment of the present disclosure may include: at least one transceiver; at least one processor; and at least one memory operably connected to the at least one processor and storing instructions for performing operations when executed by the at least one processor. The operations may include: receiving, from a B S, configuration information related to the uplink transmission, the configuration information being configured based on a first panel type and a second panel type related to the uplink transmission; and performing the uplink transmission through a panel corresponding to at least one of the first panel type and the second panel type, priority of the first panel type being set to be higher than priority of the second panel type.

In the UE according to an embodiment of the present disclosure, the panel used for the uplink transmission may belong to the first panel type or the second panel type based on usage of the uplink transmission.

In the UE according to an embodiment of the present disclosure, the panel may belong to the first panel type when the uplink transmission is sounding reference signal (SRS) transmission for beam management.

In the UE according to an embodiment of the present disclosure, the first panel type may be configured for at least one of a physical random access channel (PRACH), a physical uplink control channel (PUCCH), a physical uplink shared channel (PUSCH), and a sounding reference signal (SRS), and the second panel type may be configured for at least one of the PUCCH, the PUSCH and the SRS.

In the UE according to an embodiment of the present disclosure, when the uplink transmission is joint transmission for multiple BSs, the first panel type may be a preset default panel type for the joint transmission.

In the UE according to an embodiment of the present disclosure, the operations may further include receiving scheduling information for the uplink transmission through one of downlink control information (DCI) and a medium access control-control element (MAC-CE), wherein the scheduling information may include information indicating one of the first panel type and the second panel type to be applied to the uplink transmission.

A device performing uplink transmission in a wireless communication system according to an embodiment of the present disclosure may include: at least one processor; and at least one memory operably connected to the at least one processor and storing instructions for performing operations when executed by the at least one processor. The operations may include: receiving, from a BS, configuration information related to the uplink transmission, the configuration information being configured based on a first panel type and a second panel type related to the uplink transmission; and performing the uplink transmission through a panel corresponding to at least one of the first panel type and the second panel type, priority of the first panel type being set to be higher than priority of the second panel type.

Advantageous Effects

According to embodiments of the present disclosure, in transmission and reception between a UE and a base station, it is possible to perform efficient transmission and reception based on classification of panels according to purpose and/or usage, a hierarchical configuration method, a configuration method considering switching delay, a configuration method considering slot aggregation, and/or uplink beam sweeping.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a resource grid supported by a wireless communication system to which a method proposed in the present disclosure may be applied.

FIG. 4 illustrates examples of a resource grid for each antenna port and numerology to which a method proposed in the present disclosure may be applied.

FIG. 5 shows an example of a block diagram of a transmitter configured with an analog beamformer and RF chains.

FIG. 6 shows an example of a block diagram of a transmitter configured with a digital beamformer and RF chains.

FIG. 7 illustrates an example of an analog beam scanning method.

FIG. 8 is a diagram for a comparison between beam scanning application methods.

FIG. 9 illustrates an example of start OFDM symbols.

FIG. 10 illustrates an example of an RACH configuration table.

FIG. 11 is a diagram illustrating an example of RACH configuration intervals and mapping interval sets.

FIG. 12 is a diagram illustrating an RACH procedure.

FIG. 13 illustrates an example of an overall RACH procedure.

FIG. 14 is a diagram illustrating an example of TA.

FIG. 15 illustrates an example of the retransmission of MSG3 and MSG4 transmission.

FIG. 16 illustrates a threshold concept of an SS block for RACH resource association.

FIG. 17 is a diagram illustrating an example of a change in the power ramping count in an RACH procedure.

FIG. 18 is a diagram illustrating the concept of a USU proposed in the present disclosure.

FIG. 19 is a flowchart illustrating an operation of a UE that performs uplink transmission based on one or more panels in a wireless communication system to which methods proposed in the present disclosure are applicable.

FIG. 20 is a flowchart illustrating an operation of a base station (BS) that receives an uplink channel and/or an uplink signal transmitted based on one or more panels in a wireless communication system to which the methods proposed in the present disclosure are applicable.

FIG. 21 illustrates an example of signaling between a BS and a UE that perform uplink transmission and reception in a wireless communication system to which the methods proposed in the present disclosure are applicable.

FIG. 22 illustrates a communication system to which the present disclosure is applied.

FIG. 23 illustrates a wireless device applicable to the present disclosure.

FIG. 24 illustrates another example of a wireless device applied to the present disclosure.

FIG. 25 illustrates a portable device applied to the present disclosure.

FIG. 26 illustrates an AI device applied to the present disclosure.

FIG. 27 illustrates an AI server applied to the present disclosure.

MODE FOR DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with a terms, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A/NR is primarily described for clear description, but technical features of the present disclosure are not limited thereto.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality.

Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive occasion in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure described below can be implemented by combining or modifying respective embodiments to meet the aforementioned requirements of 5G.

Definition of Terms eLTE eNB: eLTE eNB is the evolution of an eNB that supports connectivity to the EPC and the NGC.

gNB: A node which supports the NR as well as connectivity to the NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max}N_f/100) \cdot T_s=10$ ms. The radio frame is composed of ten subframes each having a section of $T_{sf}=(\Delta f_{max}N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{subframe}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 illustrates the number of OFDM symbols per slot for a normal CP in the numerology μ, and Table 3 illustrates the number of OFDM symbols per slot for an extended CP in the numerology μ.

Table 2 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

NR Physical Resource

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi-co-located or quasi co-location (QC/QCL) relation. In this case, the large-scale properties may include at least one of delay spread, Doppler spread, frequency shift, average received power, and received timing.

FIG. 3 illustrates an example of a resource grid supported in a wireless communication system to which a method proposed in the present disclosure is applicable.

Referring to FIG. 3, a resource grid consists of $N_{RB}^\mu N_{sc}^{RB}$ subcarriers on a frequency domain, each subframe consisting of $14 \cdot 2^\mu$ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 4, one resource grid may be configured per numerology μ and antenna port p.

FIG. 4 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, . . . , $N_{RB}^\mu N_{sc}^{RB}-1$ an index on a frequency domain, and refers to a location of a symbol in a subframe. The index pair (k,l) is used to refer to a resource element in a slot, where l=0, . . . , $N_{symb}^\mu -1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block numbe $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

wherein k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

wherein $N_{BWP,i}^{start}$ may be the common resource block where the BWP starts relative to the common resource block 0.

Uplink Control Channel

Physical uplink control signaling should be able to carry at least hybrid-ARQ acknowledgements, CSI reports (possibly including beamforming information), and scheduling requests.

At least two transmission methods are supported for an UL control channel supported in an NR system.

The UL control channel can be transmitted in short duration around last transmitted UL symbol(s) of a slot. In this case, the UL control channel is time-division-multiplexed and/or frequency-division-multiplexed with an UL data channel within a slot. For the UL control channel in short duration, transmission over one symbol duration of a slot is supported.

Short uplink control information (UCI) and data are frequency-division-multiplexed both within a UE and between UEs, at least for the case where physical resource blocks (PRBs) for short UCI and data do not overlap.

In order to support time division multiplexing (TDM) of a short PUCCH from different UEs in the same slot, a mechanism is supported to inform the UE of whether or not symbol(s) in a slot to transmit the short PUCCH is supported at least above 6 GHz.

At least following is supported for the PUCCH in 1-symbol duration: 1) UCI and a reference signal (RS) are multiplexed in a given OFDM symbol in a frequency division multiplexing (FDM) manner if the RS is multiplexed, and 2) there is the same subcarrier spacing between downlink (DL)/uplink (UL) data and PUCCH in short-duration in the same slot.

At least one PUCCH in short-duration spanning 2-symbol duration of a slot is supported. In this instance, there is the same subcarrier spacing between DL/UL data and the PUCCH in short-duration in the same slot.

At least semi-static configuration, in which a PUCCH resource of a given UE within a slot. i.e., short PUCCHs of different UEs can be time-division multiplexed within a given duration in a slot, is supported.

The PUCCH resource includes a time domain, a frequency domain, and when applicable, a code domain.

The PUCCH in short-duration can span until an end of a slot from UE perspective. In this instance, no explicit gap symbol is necessary after the PUCCH in short-duration.

For a slot (i.e., DL-centric slot) having a short UL part, 'short UCI' and data can be frequency-division multiplexed by one UE if data is scheduled on the short UL part.

The UL control channel can be transmitted in long duration over multiple UL symbols so as to improve coverage. In this case, the UL control channel is frequency-division-multiplexed with the UL data channel within a slot.

UCI carried by a long duration UL control channel at least with a low peak to average power ratio (PAPR) design can be transmitted in one slot or multiple slots.

Transmission across multiple slots is allowed for a total duration (e.g. 1 ms) for at least some cases.

In the case of the long duration UL control channel, the TDM between the RS and the UCI is supported for DFT-S-OFDM.

A long UL part of a slot can be used for transmission of PUCCH in long-duration. That is, the PUCCH in long-duration is supported for both a UL-only slot and a slot having the variable number of symbols comprised of a minimum of 4 symbols.

For at least 1 or 2 UCI bits, the UCI can be repeated within N slots (N>1), and the N slots may be adjacent or may not be adjacent in slots where PUCCH in long-duration is allowed.

Simultaneous transmission of PUSCH and PUCCH for at least the long PUCCH is supported. That is, uplink control on PUCCH resources is transmitted even in the case of the presence of data. In addition to the simultaneous PUCCH-PUSCH transmission, UCI on the PUSCH is supported.

Intra-TTI slot frequency-hopping is supported.

DFT-s-OFDM waveform is supported.

Transmit antenna diversity is supported.

Both TDM and FDM between short duration PUCCH and long duration PUCCH are supported at least for different UEs in one slot. In a frequency domain, a PRB (or multiple PRBs) is a minimum resource unit size for the UL control channel. If hopping is used, a frequency resource and the hopping may not spread over a carrier bandwidth. Further, a UE-specific RS is used for NR-PUCCH transmission. A set of PUCCH resources is configured by higher layer signaling, and a PUCCH resource within the configured set is indicated by downlink control information (DCI).

As part of the DCI, it should be possible to dynamically indicate (at least in combination with RRC) the timing between data reception and hybrid-ARQ acknowledgement transmission. A combination of the semi-static configuration and (for at least some types of UCI information) dynamic signaling is used to determine the PUCCH resource for both 'long and short PUCCH formats'. Here, the PUCCH resource includes a time domain, a frequency domain, and when applicable, a code domain. The UCI on the PUSCH, i.e., using some of the scheduled resources for the UCI is supported in case of simultaneous transmission of UCI and data.

At least UL transmission of at least single HARQ-ACK bit is supported. A mechanism enabling the frequency diversity is supported. In case of ultra-reliable and low-latency communication (URLLC), a time interval between scheduling request (SR) resources configured for a UE can be less than a slot.

Hybrid Beamforming

The existing beamforming technology using multiple antennas may be divided into an analog beamforming scheme and a digital beamforming scheme depending on the location where a beamforming weight vector/precoding vector is applied.

The analog beamforming scheme is a beamforming scheme applied to an initial multiple antenna structure. This may mean a scheme for branching an analog signal on which digital signal processing has been completed into a plurality of paths and forming a beam by applying a phase shift (PS) and power amplifier (PA) configuration to each path.

For analog beamforming, there is a need for a structure in which the PA and PS connected to each antenna process an analog signal derived from one digital signal. In other words, the PA and PS of an analog stage process a complex weight.

FIG. 5 shows an example of a block diagram of a transmitter configured with an analog beamformer and RF chains. FIG. 8 is merely for convenience of description and does not limit the range of the present disclosure.

In FIG. 5, the RF chain means a processing block in which a baseband (BB) signal is converted into an analog signal. In the analog beamforming scheme, the accuracy of a beam is determined depending on the characteristics of a PA and PS. The analog beamforming scheme may be advantageous in narrowband transmission in terms of control of the devices.

Furthermore, the analog beamforming scheme has a relatively small multiplexing gain for a transfer rate increase because it is configured with a hardware structure that is difficult to implement multiple stream transmission. Furthermore, in this case, beamforming for each orthogonal resource allocation-based terminal may not be easy.

In contrast, in the digital beamforming scheme, in order to maximize diversity and a multiplexing gain in a MIMO environment, beamforming is performed in a digital stage using a baseband (BB) process.

Figure 9:
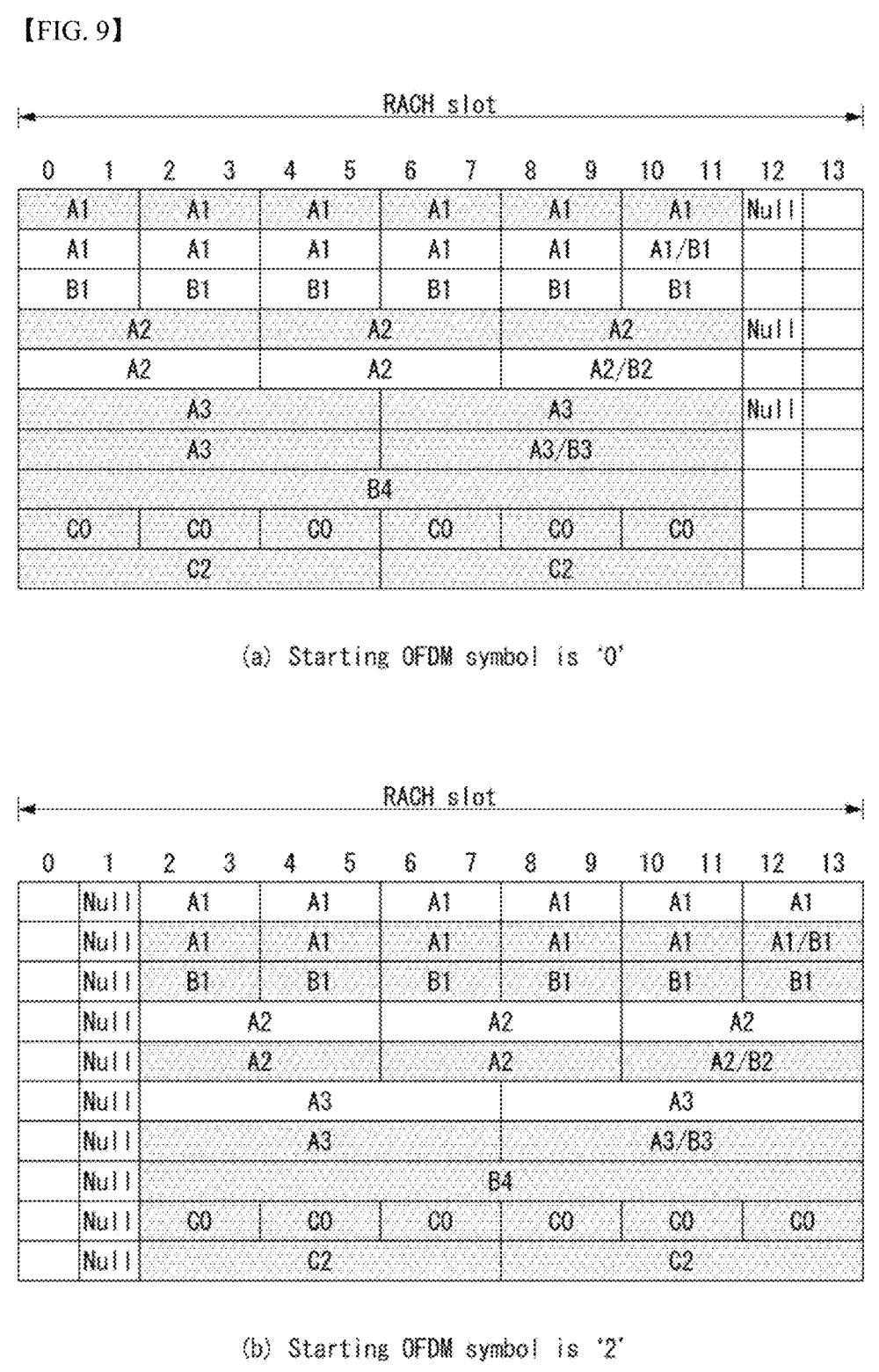

FIG. 6 shows an example of a block diagram of a transmitter configured with a digital beamformer and RF chains. FIG. 9 is merely for convenience of description and does not limit the range of the present disclosure.

In the case of FIG. 6, beamforming may be performed as precoding is performed in a BB process. In this case, an RF chain includes a PA. The reason for this is that in the digital beamforming scheme, a complex weight derived for beamforming is directly applied to transmission data.

Furthermore, multiple user beamforming may be supported at the same time because different beamforming may be performed for each terminal. Furthermore, the flexibility of scheduling is improved because independent beamforming is possible for each terminal to which an orthogonal resource has been allocated. Accordingly, an operation of a transmitter complying with a system object is possible. Furthermore, in the environment in which wideband transmission is supported, if a technology, such as MIMO-OFDM, is applied, an independent beam may be formed for each subcarrier.

Accordingly, the digital beamforming scheme can maximize a maximum transfer rate of one terminal (or user) based on a capacity increase of a system and an enhanced beam gain. In the existing 3G/4G (e.g., LTE(-A)) system, the digital beamforming-based MIMO scheme has been introduced based on characteristics, such as those described above.

In an NR system, a massive MIMO environment in which transmission and reception antenna greatly increases may be taken into consideration. In general, in cellular communication, a maximum of transmission and reception antennas applied to the MIMO environment is assumed to be 8. However, as a massive MIMO environment is taken into consideration, the number of transmission and reception antennas may be increased to tens of or hundreds of transmission and reception antennas.

In this case, in the massive MIMO environment, if the aforementioned digital beamforming technology is applied, a transmitter needs to perform signal processing on hundreds of antennas through a BB process for digital signal processing. Accordingly, the complexity of the signal processing may be greatly increased, and the complexity of a hardware implementation may be greatly increased because RF chains corresponding to the number of antennas are necessary.

Furthermore, the transmitter requires independent channel estimation for all the antennas. Furthermore, in the case of the FDD system, pilot and/or feedback overhead may excessively increase because the transmitter requires feedback information for massive MIMO channels configured with all the antennas.

However, if the aforementioned analog beamforming technology is applied in the massive MIMO environment, hardware complexity of the transmitter is relatively low.

In contrast, an increment of performance using multiple antennas is very small, and the flexibility of resource allocation may be reduced. In particular, upon wideband transmission, to control a beam for each frequency is not easy.

Accordingly, in the massive MIMO environment, only one of the analog beamforming and digital beamforming schemes is not exclusively selected, but a hybrid type transmitter configuration method in which analog beamforming and digital beamforming structures have been combined is necessary.

Analog Beam Scanning

In general, analog beamforming may be used in a pure analog beamforming transmitter and receiver and a hybrid beamforming transmitter and receiver. In this case, analog beam scanning may perform estimation on one beam at the same time. Accordingly, a beam training time necessary for beam scanning is proportional to a total number of candidate beams.

As described above, in the case of analog beamforming, a beam scanning process in the time domain is essentially necessary for transmitter and receiver beam estimation. In this case, an estimation time $T_S$ for all transmission and reception beams may be represented like Equation 3.

$$T_S = t_s \times (K_T \times K_R) \quad \text{[Equation 3]}$$

In Equation 3, $t_s$ is means a time necessary for one beam scanning, $K_T$ means the number of transmission beams, and $K_R$ means the number of reception beams.

FIG. 7 shows examples of analog beam scanning methods.

In the case of FIG. 7, it is assumed that a total number of transmission beams $K_T$ is L and a total number of reception beams $K_R$ is 1. In this case, a total number of candidate beams is L, and thus an L time interval is necessary in the time domain.

In other words, for analog beam estimation, only one beam estimation may be performed in one time interval. As shown in FIG. 7, an L time interval is necessary to perform all L beams ($P_1$ to $P_L$) estimation. After an analog beam estimation procedure is terminated, a terminal feeds the identification (e.g., ID) of a beam having the highest signal intensity back to a base station. That is, a longer training time may be necessary as the number of beams increases according to an increase in the number of transmission and reception antennas.

In analog beamforming, a training interval for an individual beam needs to be guaranteed unlike in digital beamforming because the size of a continuous waveform in a time domain and a phase angle are changed after a digital-to-analog converter (DAC). Accordingly, as the length of the training interval increases, efficiency of a system may be reduced (i.e., a loss of a system may be increased).

FIG. 8 is a diagram for a comparison between beam scanning application methods. FIG. 8(a) is an Exaustive search method, and FIG. 8(b) is a multi-level search method.

The number of search spaces (The No. of search space) of the Exaustive search method is shown in Table 4 below.

TABLE 4

|    | Beam-width: 1° | Beam-width: 5° | Beam-width: 10° |
|----|----------------|----------------|-----------------|
| 2D | 360            | 72             | 36              |
| 3D | 129,600        | 5,184          | 1,296           |

The number of search spaces of the multi-level search method is shown in Table 5 below.

TABLE 5

|    | Beam-width: 1° | | Beam-width: 10° | |
|----|----------------|------|----------------|------|
|    | Coarse beam | Fine beam | Coarse beam | Fine beam |
| 2D | 8  | 45    | 8  | 4.5   |
| 3D | 64 | 2,025 | 64 | 20.25 |

In relation to feedback, in the Exhaustive search method, the ID of the best transmission beam (Best Tx beam ID) is fed back. In the multi-level search method, the ID of the best sector beam (Best Sector beam ID) is fed back with respect to a Coarse beam, and the ID of the best fine beam (Best fine beam ID) is fed back with respect to a fine beam.

In relation to current industrial and standards, there is no related standard for the Exaustive search method, and 802.15.3c and 802.11 ad are present for the multi-level search method.

In relation to the beam scanning, more detailed contents are described in [1] J. Wang, Z. Lan, "Beam codebook based beamforming protocol for multi-Gbps millimeter-wave WPAN systems," IEEE J. Select. Areas in Commun., vol. 27, no. 8 [2] J. Kim, A. F. Molisch, "Adaptive Millimeter-Wave Beam Training for Fast Link Configuration," USC CSI's 30th conference [3] T. Nitsche, "Blind Beam Steering: Removing 60 GHz Beam Steering Overhead."

Reference Signals in NR

Downlink (DL) physical layer signals of the 3GPP NR system are as follows. More detailed description refers to 3GPP TS 38.211 and TS 38.214.

CSI-RS: signal for DL channel state information (CSI) acquisition and DL beam measurement Tracking RS (TRS): signal for fine time/frequency tracking of the UE DL DMRS: RS for PDSCH demodulation DL phase-tracking RS (PT-RS): RS transmitting for phase noise compensation of the UE Synchronization signal block (SSB): means a resource block consisting of the specific number of consecutive symbols and resource blocks on time/frequency side consisting of a primary synchronization signal (PSS), a secondary SS, and PBCH (+PBCH DMRS) (the same beam is applied to signals within one SSB)

In addition, uplink (UL) physical layer signals of the 3GPP NR system are as follows. In the same manner, more detailed description refers to 3GPP TS 38.211 and TS 38.214.

SRS: signal for UL channel state information (CSI) acquisition, UL beam measurement, and antenna port selection UL DMRS: RS for PUSCH demodulation UL phase-tracking RS (PT-RS): RS transmitting for phase noise compensation of the base station PRACH Design and RA Procedure in NR The following description relates to briefly summarized contents for the PRACH design of a random access procedure and a 3GPP NR system, and may be different from an accurate design of NR and a simultaneous design.

An accurate design may be slightly different for each release and for each version, and is described in 3GPP TS 38.211, TS 38.212, tS 38.213, TS 38.214, tS 38.321, TS 38.331.

Physical Random Access Channel (PRACH) Design

First, the principle of a PRACH design is described.

Support beam-based PRACH preamble transmission and reception

Support both FDD and TDD frame structures

Provide a dynamic cell range (a maximum 100 km)

Support a high-speed vehicle (e.g., a maximum 500 km/h)

Support a wide frequency range (e.g., a maximum 100 GHz)

Next, a sequence for a PRACH preamble is described.

ZC sequence

Provide an excellent cross-correlation characteristic and a low PAPR/CM

Sequence having two lengths for a PRACH preamble in NR a long preamble sequence (L=839)

(Use Case) used for only LTE coverage, a high-speed case/FR1 a short preamble sequence (L=139)

A multi-beam scenario is supported, and a TDD frame structure/preamble is arranged with an OFDM symbol boundary/used for both FR1 and FR2

In the case of FR1, support subcarrier spacing of 15 kHz and 30 kHz

In the case of FR2, support subcarrier spacing of 60 kHz and 120 kHz.

Table 6 below illustrates an example of a long sequence-based PRACH preamble, and relates to long preamble formats (LRA=839, subcarrier spacing={1.25, 5} kHz).

TABLE 6

| Format | SCS | TCP(Ts) | TSEQ(Ts) | TGP(Ts) | Use Case |
|--------|-----|---------|----------|---------|----------|
| 0 | 1.25 kHz | 3168k | 24576k | 2976k | LTE |

TABLE 6-continued

| Format | SCS | TCP(Ts) | TSEQ(Ts) | TGP(Ts) | Use Case |
|---|---|---|---|---|---|
| 1 | 1.25 kHz | 21024k | 2 · 24576k | 21984k | coverage Large cell, Up to 100 km |
| 2 | 1.25 kHz | 4688k | 4 · 24576k | 19888k | Related |
| 3 | 5 kHz | 3168k | 4 · 6144k | 2976k | High speed |

Table 7 below illustrates an example of a short sequence-based PRACH preamble, and relates to short preamble formats (LRA=139, subcarrier spacing={15, 30, 60, 120} kHz).

TABLE 7

| Format | | # of Sequence | TCP | TSEQ | TGP | Path profile (Ts) | Path profile (us) | Maximum Cell radius (meter) |
|---|---|---|---|---|---|---|---|---|
| A | 1 | 2 | $288k \cdot 2^{-u}$ | $2 \cdot 2048k \cdot 2^{-u}$ | $0k \cdot 2^{-u}$ | 96 | 3.13 | 938 |
|  | 2 | 4 | $576k \cdot 2^{-u}$ | $4 \cdot 2048k \cdot 2^{-u}$ | $0k \cdot 2^{-u}$ | 144 | 4.69 | 2,109 |
|  | 3 | 6 | $864k \cdot 2^{-u}$ | $6 \cdot 2048k \cdot 2^{-u}$ | $0k \cdot 2^{-u}$ | 144 | 4.69 | 3,516 |
| B | 1 | 2 | $216k \cdot 2^{-u}$ | $2 \cdot 2048k \cdot 2^{-u}$ | $72k \cdot 2^{-u}$ | 72 | 3.13 | 469 |
|  | 2 | 4 | $360k \cdot 2^{-u}$ | $4 \cdot 2048k \cdot 2^{-u}$ | $216k \cdot 2^{-u}$ | 144 | 4.69 | 1,055 |
|  | 3 | 6 | $504k \cdot 2^{-u}$ | $6 \cdot 2048k \cdot 2^{-u}$ | $360k \cdot 2^{-u}$ | 144 | 4.69 | 1,758 |
|  | 4 | 12 | $936k \cdot 2^{-u}$ | $12 \cdot 2048k \cdot 2^{-u}$ | $792k \cdot 2^{-u}$ | 144 | 4.69 | 3,867 |
| C | 0 | 1 | $1240k \cdot 2^{-u}$ | $2048k \cdot 2^{-u}$ | $1096k \cdot 2^{-u}$ | 144 | 4.69 | 5300 |
|  | 2 | 4 | $2048k \cdot 2^{-u}$ | $4 \cdot 2048k \cdot 2^{-u}$ | $2912k \cdot 2^{-u}$ | 144 | 4.69 | 9200 |

An RACH slot is described below.

An RACH slot includes one or multiple RACH Occasion (s).

Slot duration is 1 ms for {1.25 kHz, 5 kHz} subcarrier spacing, and has scalable duration (i.e., 1 ms, 0.5 ms, 0.25 ms, 0.125 ms) for {15 kHz, 30 kHz, 60 kHz, 120 kHz} subcarrier spacing.

A start OFDM symbol index in an RACH slot has {0,2,x} values for short preamble formats.

FIG. 9 illustrates an example of start OFDM symbols. Specifically, FIG. 9a illustrates a case where the start OFDM symbol is '0', and FIG. 9b illustrates a case where the start OFDM symbol is '2.'

An RACH configuration table is described below.

Multiple tables may be defined based on a frequency range and a duplex scheme.

FDD and FR1 (for both long preamble and short preamble formats)

TDD and FR1 (for both long preamble format and short preamble format)

TDD and FR2 (for only a short preamble format)

FIG. 10 illustrates an example of an RACH configuration table.

The association of an SSB and an RACH occasion is described.

A time interval from SSB to RO association

The smallest value of a set determined by an RACH configuration

All of actually transmitted SSBs may be mapped to ROs within a time interval at least once.

Table 8 below is a table illustrating an example of RACH configuration intervals and mapping interval sets, and FIG. 11 is a diagram illustrating an example of RACH configuration intervals and mapping interval sets.

TABLE 8

| RACH configuration period (ms) | Mapping Period set (# of RACH configuration period) |
|---|---|
| 10 | {1, 2, 4, 8, 16} |
| 20 | {1, 2, 4, 8} |
| 40 | {1, 2, 4} |
| 80 | {1, 2} |
| 160 | {1} |

Random Access (RA) Procedure

RA may be triggered by several events.

Initial access in RRC IDLE

RRC connection re-establishment procedure

Handover

If an UL synchronization state is 'asynchronization', DL or UL data arrival during RRC_CONNECTED Transition in RRC_INACTIVE Another system information (SI) request Beam failure recovery Two types of RACH procedures in NR are described with reference to FIG. 12.

FIG. 12a is a contention-based RACH procedure, and FIG. 12b is a contention-free RACH procedure.

FIG. 13 illustrates an example of an overall RACH procedure.

First, MSG1 transmission is described.

Subcarrier spacing for MSG1 is configured in an RACH configuration, and is provided in a handover command with respect to a contention-free RA procedure for handover.

Preamble indices for contention-based random access (CBRA) and contention-free random access (CFRA) are consecutively mapped to one SSB in one RACH transmission occasion.

CBRA

Association between an SS block (SSB) within an SS burst set and a subset of RACH resources and/or preamble indices is configured by a parameter set in an RMSI.

CFRA

A UE may be configured transmit multi-MSG1 s through a dedicated multi-RACH transmission occasion in the time domain before the end of a monitored RAR window.

Furthermore, association between a CFRA preamble and an SSB is reconfigured through UE-specific RRC.

Next, a random access response (MSG2) configuration is described.

Subcarrier spacing (SC S) for MSG2 is the same as the SCS of remaining minimum SI (RMSI).

Furthermore, the SCS is provided in a handover command with respect to a contention-free RA procedure for handover.

Furthermore, MSG2 is transmitted within a UE minimum DL BW.

The size of a RAR window is the same for all RACH opportunities, and is configured in the RMSI.

A maximum window size: depends on the worst gNB latency after Msg1 reception including processing delay, scheduling delay, etc.

A minimum window size: depends on duration of Msg2 or CORESET and scheduling latency Next, a timing advance (TA) command in MSG2 is described.

This is used to control uplink signal transmission timing.

First, in the case of LTE,

TA resolution is 16 Ts (Ts=1/(2048×15000)).

ATA range uses 1282×TA step size~667.66.→100.16

In an RAR, a timing advance (TA) has values from 0 to 1,282, and set to 11 bits.

In the case of NR,

In TR38.913, this is used in a very long coverage (150 Km~300 Km).

A TA increase in 2,564 or 3,846 TA_step (12its)

FIG. 14 is a diagram illustrating an example of TA. RA-RNTI

RA_RNTI is determined by a UE by transmitting timing of a PRACH Preamble.

That is, RA_RNTI may be determined by Equation 4 below.

$$RA\_RNTI = 1 + s\_id + 14 * t\_id + 14 * X * f\_id + 14 * X * Y * ul\_carrier\_id \quad [\text{Equation 4}]$$

In Equation 4, s_id indicates the first OFDM symbol index (0≤s_id<14), t_id indicates the first slot index in a system frame (0≤t_id<X), X is fixed 80 for 120 kHz SCS, f_id indicates a frequency domain index (0≤f_id<Y), Y is fixed 8 for a maximum #n of FDMed ROs, and ul_carrier_id indicates an indication of an UL carrier (0:normal, 1:SUL).

A minimum gap between MSG2 and MSG3 is duration of N1+duration of N2+L2+TA.

In this case, N1, N2 are front loaded+additional DMRS and a UE capability, L2 is a MAC process latency (500 us), and TA is the same as a maximum timing advance value.

If MSG2 does not include a response to a transmitted preamble sequence, a new preamble sequence is transmitted after duration of N1+Δnew+L2.

Table 9 illustrates an example of a DCI format 1-0 having an RA-RNTI.

TABLE 9

| Field | Bits | Comment |
|---|---|---|
| Identifier for DCI formats | 1 | Reserved |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use MCS table without 256QAM (UE capabilities not yet known) |
| New data indicator | 1 | Reserved |
| Redundancy version | 2 | Reserved |
| HARQ process number | 4 | Reserved |
| Downlink assignment index | 2 | Reserved |
| TPC command for scheduled PUCCH | 2 | Reserved |
| PUCCH resource indicator | 3 | Reserved |

TABLE 9-continued

| Field | Bits | Comment |
|---|---|---|
| PDSCH-to-HARQ feedback timing indicator | 3 | Reserved |

Next, Message3 is described.

MSG3 is scheduled by an uplink grant in the RAR.

The MSG3 is transmitted after a minimum time interval from the end of MSG2.

Transmission power of MSG3 is configured in MSG2.

An SCS for MSG3 is configured in an RMSI including 1 bit (independently of an SCS for MSG1).

MSG3 includes a UE-Identity and an establishment cause.

First, with respect to the UE-Identity, an IMSI is transmitted in a message when it is first attached to a network.

If a UE is previously attached, an S-TMSI is included in the message.

Furthermore, the establishment cause may include emergency, MO-signaling, MO-data, MT-access, high-priority access, etc.

Table 10 below illustrates an example of a DCI format 0-0 having a TC-RNTI for MSG3 retransmission.

TABLE 10

| Field | Bits | Comment |
|---|---|---|
| Identifier for DCI formats | 1 | Indicate UL |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use MCS table without 256QAM (UE capabilities not yet known) |
| New data indicator | 1 | Reserved |
| Redundancy version | 2 | Defined in Table 7.3.1.1.1-2 |
| HARQ process number | 4 | Reserved HARQ process 0 is always used |
| TPC command for scheduled PUCCH | [2] | Defined in Subclause 7.2.1 of TS 38.213 |
| UL/SUL indicator | 1 | |

An MSG4 configuration is described.

An MSG4 configuration is limited within a UE minimum DL BW.

An SCS for MSG4 is the same as a numerology for an RMSI and MSG2.

A minimum gap between the starts of MSG4 and HARQ-ACK is N1+L2.

In this case, N1 indicates a UE processing time, and L2 indicates a MAC layer processing time.

Retransmission order of MSG 3 and a distinction between MSG4s are described.

MSG3 retransmission: DCI format 0-0 having a TC-RNTI

MSG4: DCI format 1-0 having a TC-RNTI

FIG. 15 illustrates an example of the retransmission of MSG3 and MSG4 transmission.

Table 11 below is a table illustrating an example of DCI format 1-0 having a TC-RNTI for MSG4.

TABLE 11

| Field | Bits | Comment |
|---|---|---|
| Identifier for DCI formats | 1 | Indicate UL |

TABLE 11-continued

| Field | Bits | Comment |
|---|---|---|
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use UE-capability-independent MCS table |
| New data indicator | 1 | Reserved |
| Redundancy version | 2 | Defined in Table 7.3.1.1.1-2 |
| HARQ process number | 4 | Reserved HARQ process 0 is always used |
| TPC command for scheduled PUCCH | [2] | Defined in Subclause 7.2.1 of TS 38.213 |
| UL/SUL indicator | 1 | |

Hereinafter, a random access procedure of an NR system is more specifically described.

A UE may transmit a PRACH preamble in UL as Msg1 of a random access procedure.

Random access preamble sequences having two different lengths are supported. A long sequence length 839 is applied as subcarrier spacing of 1.25 and 5 kHz, and a short sequence length 139 is applied as subcarrier spacing of 15, 30, 60 and 120 kHz. The long sequence supports a not-limited types set and limited types of sets A and B, but the short sequence supports only a not-limited type set.

Multiple RACH preamble formats are defined as one or more RACH OFDM symbols and different cyclic prefixes and a guard time. A PRACH preamble configuration is provided to a UE within system information.

If a response to Msg1 is not present, a UE may retransmit a PRACH preamble with power ramping within a given number. The UE calculates PRACH transmission power for the retransmission of a preamble based on the most recent estimation path loss and a power ramping counter. If the UE performs beam switching, the power ramping counter is not changed.

System information notifies the UE of association between SS blocks and RACH resources.

FIG. 16 illustrates a threshold concept of an SS block for RACH resource association.

Referring to FIG. 16, a threshold of an SS block for RACH resource association is based on RSRP and a network configuration. The transmission or retransmission of an RACH preamble is based on an SS block that satisfies a threshold.

When a UE receives a random access response through a DL-SCH, the DL-SCH may provide timing alignment information, an RA-preamble ID, initial UL approval and a temporary C-RNTI. Based on the information, the UE may perform UL transmission through an UL-SCH as Msg3 of a random access procedure. The Msg3 may include an RRC connection request and a UE identifier.

In response to the Msg3, a network may transmit Msg4. The Msg4 may be treated as a contention solution message for DL. The UE may enter an RRC connected state by receiving the Msg4.

A more detailed description for each step is as follows.

Before a physical random access procedure is started, Layer 1 needs to receive an SS/PBCH block index set from a higher layer and provide a corresponding RSRP measurement set to the higher layer.

Before the physical random access procedure is started, Layer 1 receives next information from the higher layer.

A configuration of a physical random access channel (PRACH) transmission parameter (PRACH preamble format, a time resource, and a frequency resource for PRACH transmission).

A PRACH preamble sequence set (a logical root sequence table and a cyclic shift), a root sequence for a set type (a not-limited type, a restriction set A or a restriction set B), and a parameter for determining a cyclic shift thereof).

From a viewpoint of the physical layer, an L1 random access procedure includes the transmission of a random access response (RAR) message having a random access preamble (Msg1) and a PDCCH/PDSCH (Msg2) within a PRACH, and may include the PUSCH transmission of Msg3, and a PDSCH for a contention solution.

If the random access procedure is initiated by a "PDCCH order" for a UE, the transmission of a random access preamble has the same subcarrier spacing as that of the transmission of a random access preamble initiated by a higher layer.

If the UE is configured with uplink carriers for a serving cell and detects a "PDCCH order", the UE uses an UL/SUL indicator field value from the detected "PDCCH order" in order to determine an uplink carrier for corresponding random access.

In relation to the random access preamble transmission step, the physical random access procedure is triggered in response to a request for PRACH transmission by higher layers or a PDCCH command. A configuration for the PRACH transmission by a higher layer includes the followings:

A configuration for PRACH transmission.

A preamble index, preamble subcarrier spacing, $P_{PRACH, target}$, a corresponding RA-RNTI, and a PRACH resource.

A preamble is transmitted using a PRACH format selected with transmission power $P_{PRACH,b,f,c}(i)$ on the indicated PRACH resource.

The UE is provided with multiple SS/PBCH blocks associated with one PRACH case based on a value of a higher layer parameter SSB-perRACH-Occasion. When the SSB-perRACH-Occasion value is smaller than 1, one SS/PBCH block is mapped to a 1/SSB-rach-occasion consecutive PRACH case.

The UE is provided with multiple preambles per SS/PBCH block based on the value of a higher layer parameter cb-preamblePerSSB, and determines a total number of preambles per SSB according to the PRACH occasion as a multiple of an SSB-perRACH-Occasion value and a value of cb-preamblePerSSB.

An SS/PBCH block index is mapped the PRACH case in a next order.

First, the order of a preamble index is increased within a single PRACH event.

Second, the order of a frequency resource index for a frequency-multiplexed PRACH case is increased.

Third, an increase order of a time resource index for a time-multiplexed PRACH case within a PRACH slot.

Fourth, an increase order of an index for a PRACH slot.

A period starting from a frame 0, for mapping an SS/PBCH block to a PRACH case is the smallest period among {1, 2, 4} PRACH configuration periods greater than or equal to $\lceil N_{Tx}^{SSB}/N_{PRACH\ period}^{SSB} \rceil$. In this case, a UE obtains $N_{Tx}^{SSB}$ from a higher layer parameter SSB_transmitted-SIB1. $N_{Tx}^{SSB}$ is the number of SS/PBCH block which may be mapped to one PRACH configuration cycle.

When a random access procedure is initiated by a PDCCH command, (if requested by a higher layer) the UE has to transmit a PRACH in the first possible PRACH occasion. The first possible PRACH occasion is a case where time between the last symbol of PDCCH order reception and the first symbol of a PRACH for transmission is greater than or equal to $N_{T,2}+\Delta_{BWPSwitching}+\Delta_{Delay}$ msec. $N_{T,2}$ is a time length of $N_2$ symbol, $\Delta_{BWPSwitching}$ is previously configured in a PUSCH processing capability 1, and a PUSCH preparation time corresponds to $\Delta_{Delay}>0$.

In response to the PRACH transmission, the UE attempts to detect a PDCCH having a corresponding RA-RNTI during a window controlled by a higher layer. The window starts in a first symbol of the fastest control resource set configured with respect to a Type1-PDCCH common search space, that is, a $\lceil (\Delta \cdot N_{slot}^{subframe,\mu} \cdot N_{symb}^{slot})/T_{sf} \rceil$ at least after the last symbol of a preamble sequence transmitted by the UE. The length of the window is provided by a higher layer parameter rar-WindowLength based on the number of slots based on a subcarrier space for the Type0-PDCCH common search space.

When the UE detects the PDCCH having the corresponding RA-RNTI and a corresponding PDSCH including a DL-SCH transmission block within the corresponding window, the UE transmits a transport block to a higher layer.

The higher layer parses the transport block with respect to a random access preamble identifier (RAPID) related to the PRACH transmission. When the higher layer identifies the RAPID in the RAR message(s) of the DL-SCH transmission block, the higher layer indicates an uplink permission for the physical layer. Such indication is denoted as a random access response (RAR) UL grant in the physical layer. If the higher layer does not identify an RAPID related to the PRACH transmission, the higher layer may instruct a physical layer in order to transmit the PRACH.

A minimum time between the last symbol of a PDSCH for reception and the first symbol of the PRACH transmission is the same as $N_{T,1}+\Delta_{new}+0.5$ msec. In this case $N_{T,1}$, msec is duration of an $N_1$ symbol corresponding to a PDSCH reception time for the PDSCH capability 1 when $\Delta_{new} \geq 0$ if an additional PDSCH DM-RS is configured.

The UE needs to receive a PDCCH having an RA-RNTI corresponding to the PDSC, including a DL-SCH transmission block having the same DM-RS antenna port quasi co-location attributes for the detected SS/PBCH block or the received CSI-RS. When the UE attempts to the PDCCH having a corresponding RA-RNTI in response to the PRACH transmission initiated by a PDCCH command, the UE assumes that the PDCCH and a PDCCH order have the same DM-RS antenna port quasi co-location attributes.

An RAR UL grant from the UE (Msg3 PUSCH) schedules PUSCH transmission. The contents of the RAR UL grant that starts from the MSB and ends at the LSB are illustrated in Table 12 below. Table 12 below lists field sizes of random access response grant contents.

Msg3 PUSCH frequency resource allocation is for an uplink resource allocation type 1. In the case of frequency hopping, a 1- or 2-bits $N_{UL,hop}$ bit field of Msg3 PUSCH frequency resource allocation is used as a hopping information bit as described with reference to Table 10 based on the indication of a frequency hopping flag field.

An MCS is determined from the first 16 indices of a corresponding MCS index table for a PUSCH. A TPC command $\delta_{msg\ 2,b,f,c}$ is used to configure power of an Msg3 PUSCH, and is interpreted based on Table 13 below illustrating TPC commands $\delta_{msg\ 2,b,f,c}$ for the Msg3 PUSCH.

TABLE 13

| TPC Command | Value(in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

In a non-contention-based random access procedure, a CSI request field is interpreted to determine whether an aperiodic CSI report is included in corresponding PUSCH transmission. In a contention-based random access procedure, a CSI request field is reserved.

The UE receives a subsequent PDSCH using the same subcarrier spacing as that of the reception of a PDSCH that provides an RAR message unless subcarrier spacing is configured.

If the UE does not detect a PDCCH having a corresponding RA-RNTI and a corresponding DL-SCH transmission block within the window, the UE performs a random access response reception failure procedure.

For example, the UE may perform power ramping for the retransmission of a random access preamble based on a power ramping counter. However, as illustrated in FIG. 17, if the UE performs beam switching in PRACH retransmission, the power ramping counter is not changed.

Referring to FIG. 17, when retransmitting the random access preamble for the same beam, the UE may increase the power ramping counter by 1. However, when the beam is changed, the power ramping counter is not changed.

In relation to the transmission of the Msg3 PUSCH, the higher layer parameter msg3-tp indicates whether to apply transform pre-coding for the transmission of the Msg3 PUSCH with respect to the UE. If the UE applies transform pre-coding to the transmission of the Msg3 PUSCH having frequency hopping, a frequency offset for a second hop is provided in Table 14 below. Table 14 illustrates frequency offsets for the second hop with respect to the transmission of the Msg3 PUSCH having frequency hopping.

TABLE 12

| RAR grant field | Number of bits |
|---|---|
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

TABLE 14

| Number of PRBs in initial active UL BWP | Value of $N_{UL,hop}$ Hopping Bits | Frequency offset for 2nd hop |
|---|---|---|
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $-N_{BWP}^{size}/4$ |
|  | 11 | Reserved |

Subcarrier spacing for the transmission of the Msg3 PUSCH is provided by a higher layer parameter msg3-scs. The UE needs to transmit a PRACH and an Msg3 PUSCH in the same uplink carrier of the same serving cell. An UL BWP for the transmission of the Msg3 PUSCH is indicated by SystemInformationBlockType1.

When a PDSCH and a PUSCH have the same subcarrier spacing, a minimum time between the last symbol of PDSCH for reception that carries an RAR and a first symbol of the corresponding Msg3 PUSCH scheduled by the RAR in the PDSCH for the transmission to the UE is identical with $N_{T,1}+N_{T,2}+N_{TA,max}+0.5$ msec. $N_{T,1}$ is duration of an $N_1$ symbol corresponding to a PDSCH reception time for the PDSCH processing capability 1 when an additional PDSCH DM-RS is configured. $N_{T,2}$ is duration of an $N_2$ symbol corresponding to a PUSCH preparation time with respect to the PUSCH processing capability 1. Furthermore, $N_{TA,max}$ is a maximum timing adjustment value which may be provided by a TA command field within the RAR.

In response to the transmission of the Msg3 PUSCH indicating that a C-RNTI has not been provided, the UE attempts to detect a PDCCH along with a TC-RNTI corresponding to the scheduling of a PDSCH including a UE contention resolution identity. In response to the reception of the PDSCH having the UE contention resolution identity, the UE transmits HARQ-ACK information in a PUCCH. A minimum time between the last symbol of the PDSCH for reception and a first symbol of corresponding HARQ-ACK for transmission is the same as $N_{T,1}+0.5$ msec. $N_{T,1}$ is duration of the $N_1$ symbol corresponding to the PDSCH reception time for the PDSCH processing capability 1 when an additional PDSCH DM-RS is configured.

PUSCH Transmission Related Procedure

If a UE is configured by a higher layer to decode a PDCCH CRC-scrambled by a C-RNTI, the UE needs to decode the PDCCH and transmit a corresponding PUSCH.

The transmission of the PUSCH may be dynamically scheduled in DCI by an UL grant or may be semi-statically configured as soon as when a higher layer parameter of configuredGrantConfig including rrc-ConfiguredUplinkGrnat is received without detecting an UL grant or may be may be semi-statically configured based on configuredGrantConfig not including rrc-ConfiguredUplinkGrant semi-statically scheduled by an UL grant after a higher layer parameter configuredGrantConfig not including rrc-ConfiguredUplinkGrant is received.

In the case of a PUSCH scheduled by a DCI format 0_0 in a cell, a UE may transmit the PUSCH based on a spatial relation corresponding to a PUSCH resource.

In relation to a PUSCH transmission scheme, codebook-based transmission (CB transmission) and non-codebook-based transmission (NCB transmission) may be supported. A UE may perform CB transmission when a higher layer parameter txConfig in PUSCH-Config is configured as a 'codebook', and may perform NCB transmission when the txConfig is configured as 'nonCodebook.' If the txConfig is not configured, PUSCH transmission may be based on one PUSCH antenna port, which may be triggered by the DCI format 0_0.

First, codebook-based uplink transmission is specifically described.

In the case of CB transmission, a UE may determine a PUSCH transmission precoder based on an SRS resource indicator (SRI), a transmit precoding matrix indicator (TPMI), and a transmit rank indicator (TRI). In this case, the SRI, the TPMI, and the TRI may be given by SRS resource indicator field information, precoding information and the number of layers information included in a DCI field. The TPMI may be used to indicate a precoder to be applied through antenna ports {0 . . . v−1} corresponding to an SRS resource selected by an SRI, when multiple SRS resources are configured or one SRS resource is configured, or the TPMI may be used to indicate a precoder to be applied through antenna ports {0 . . . v−1} corresponding to an SRS resource.

The transmission precoder may be selected in an uplink codebook including the same multiple antenna ports as a higher layer parameter nrofSRS-Ports of SRS-Config. When the UE is configured to have a higher layer parameter txConfig configured as a 'codebook', the UE may be configured with at least one SRS resource. An SRI indicated in a slot n may be related to the most recent transmission of an SRS resource prior to a PDCCH that carries an SRI prior to the slot n, that is, an SRS resource identified by the SRI.

Furthermore, in the case of CB transmission, a UE may be configured with a single SRS resource set. Only one SRS resource may be indicated in an SRI within the SRS resource set. A maximum number of SRS resources configured for the CB transmission may be 2. When an aperiodic (AP)-SRS is configured for the UE, an SRS request field of DCI may trigger the transmission of an AP-SRS resource. Furthermore, when multiple SRS resources are configured, the UE may expect that the higher layer parameter nrofSRS-Ports of SRS-Config is set as the same value in all SRS resources and a higher layer parameter resourceType of SRS-ResourceSet is set as the same value for all the SRS resources.

Next, non-codebook-based uplink transmission is specifically described.

In the case of NCB transmission, a UE may determine its own PUSCH precoder and transmission rank based on a wideband SRI given by an SRI field from DCI. The UE may use one or multiple SRS resources for SRS transmission. The number of SRS resources which may be configured for the UE for simultaneous transmission in the same RB may be a UE capability. Furthermore, only one SRS port may be configured for each SRS resource. Furthermore, if a higher layer parameter usage of SRS-Config is configured as 'non-Codebook', only one SRS resource set may be configured. A maximum number of SRS resources which may be configured for non-codebook-based uplink transmission is 4. Furthermore, an SRI indicated in a slot n may be related to the most recent transmission of an SRS resource prior to a PDCCH that carries an SRI prior to the slot n, that is, an SRS resource identified by the SRI.

In the case of NCB transmission, a UE may calculate a precoder to be used for precoding or the transmission of an SRS based on the measurement of an associated NZP CSI-RS resource. The UE may be configured with only one NZP CSI-RS resource for an SRS resource set. Furthermore, in the case of NCB transmission, the UE does not expect that both associatedCSI-RS in SRS-Config for an SRS resource set and spatialRelationInfo for an SRS resource may be configured. Furthermore, in the case of NCB transmission, when at least one SRS resource is configured, the UE may be scheduled by the DCI format 0_1.

Transmission Unit/Reception Unit (e.g., a Panel)—Related General

In current/future wireless communication systems, various UE types need to be considered and supported.

A current LTE system has been optimized for a single panel UE.

A multi-panel UE is supported in a Rel-15 NR system having a very restricted range.

In Rel-15 NR, multiple SRS resources may be configured for a UE. If multiple SRS resources are configured, the UE may transmit a set of SRS antenna ports configured in an SRS resource from one panel, a set of other SRS ports configured in another SRS resource from another panel, etc.

With respect to non-codebook-based uplink transmission, a set of SRS resources may be transmitted by the same panel by applying different beams. Another set of SRS resources may be transmitted by another panel by applying different beams. In this case, only one port (i.e., port-wise) SRS beamforming is applied to each SRS resource. That is, each SRS resource/port corresponds to a layer candidate to be applied to future PUSCH transmission.

In summary, a UE may use a different transmission panel for the transmission of different (a set of) SRS resources.

A gNB receives and compares SRS ports. Thereafter, the gNB selects one of configured SRS resources and transmits an SRS resource indicator (SRI) along with a transmit precoding matrix indicator (TPMI) and a transmit rank indicator (TRI) with respect to codebook-based PUSCH transmission.

When the UE accurately receives a command, the UE needs to use a panel indicated through the SRI for PUSCH transmission. With respect to non-codebook-based UL transmission, the gNB needs to merely transmit only an SRI(s), and the UE needs to apply a layer selected from a panel.

If Rel-15 codebook (CB)-based UL transmission is applied to multi-panel UEs, the following restriction contents are applied.
  A different number of transmission antenna ports per panel are not supported.
  The simultaneous use of multiple panels for PUSCH transmission is disabled or limitedly supported.

The following restriction contents are present with respect to non-codebook-based UL transmission.
  Ambiguity related to a method of mapping each SRS resource to each panel
  The simultaneous use of multiple panels for PUSCH transmission is disabled or limitedly supported Another important thing of multi-panel UEs is the distance between panels.

With respect to a handheld device, the distance between panels is not distant, but the distance between panels may be distant in the case of a large-sized device, such as a vehicle.

With respect to a vehicle UE, a vehicle (e.g., a car) may be a device which receives a signal for downlink (DL) and transmits a signal for uplink (UL).

With respect to a sidelink, a vehicle may be a transmitter and/or a receiver. Most of current vehicles have antennas (e.g., a single panel) geographically deployed at the same location. In order to obtain more gains from multiple antennas (e.g., beamforming or spatial diversity), geographically distributed antennas (e.g., multi-panels) are considered to satisfy NR requirement contents (some NR bands need to use four or more Rx antennas).

With respect to geographically distributed antennas, the distance between panels may be several meters or more on the vehicle UE side (e.g., one panel in a front bumper and the other panel in a rear bumper).

Additionally, the orientation/boresight/direction of each panel may be different. Accordingly, fading characteristics of panels may be quite different.

Furthermore, each panel may have a different hardware characteristic. If geographically distributed antennas share a common baseband processor (modem), the distance from each panel to the baseband processor may be different.

Accordingly, a gain imbalance between different panels may occur in both transmission and reception. Furthermore, a difference between cable lengths may cause different latency (i.e., timing synchronization) in different panels. Since the addition of a timing adjustment processor/circuit may increase a UE implementation cost, a timing difference between different panels may be internally adjusted depending on a UE implementation or may not be adjusted.

In addition to cabling, if a different hardware configuration element (e.g., an oscillator, a different RF/circuit structure, an amplifier, or a phase shifter) per panel is used, there may occur a difference between channel characteristics experienced in different panels, such as phase noise, a frequency offset, or a timing offset.

In the present disclosure, a 'panel' may mean a physical transmission/reception antenna group closely located in relation to a hardware implementation.

In general, an (UL) panel, an uplink synchronization unit (USU), an uplink transmission unit (UTU), etc. which are used in the present disclosure may be represented as a transmission unit, and may be used as various expressions within a range in which meanings thereof are not different. Furthermore, in general, a (DL) panel, a downlink synchronization unit (DSU), a downlink transmission unit (DTU), etc. which are used in the present disclosure may be represented as a reception unit, and may be used as various expressions within a range in which meanings thereof are not different.

However, from a viewpoint of a standard document, a 'panel' may indicate a group of antenna ports (i.e., logical antennas) having a common feature from a viewpoint of a valid channel due to shared hardware components (e.g., an amplifier and a hardware board) in addition to not-far geographical locations.

More specifically, long-term channel characteristics of antenna ports transmitted by the same panel, such as an average path-loss, an average Doppler shift, or average delay, may be monitored by a receiver similarly or identically.

With respect to a reception viewpoint, a signal monitored by different logical antennas within the same panel with respect to a transmitted antenna port may be assumed to have a common feature from a viewpoint of a long-term channel characteristic.

In addition to the aforementioned long-term channel characteristics, a panel may share the same Tx/Rx (analog) beam or beam set, but other panels may use different (analog) beams or beam sets. That is, there is a good possibility that each panel may individually control a beam due to a geographical difference.

In the present disclosure, '/' may mean 'or' or 'and/or' depending on context.

the present disclosure focuses on an UL synchronization problem related to multi-panel UEs, in particular, among the aforementioned problems. The best timing advance (TA) value for multi-panel UEs may be different for each panel depending on the aforementioned UE implementation (e.g., a distributed antenna in a UE). In previous systems, since it is assumed that a geographical location between a UE and multiple antennas is sufficiently close, one TA value is provided by a gNB with respect to one component carrier (CC) of the same device.

Furthermore, UL Tx timing through different transmission antennas is assumed to be well-calibrated within a UE as a UE implementation.

As described above, the two existing assumptions (geographical location and internal calibration) may be no longer maintained with respect to a new device type (e.g., vehicle UE).

Accordingly, it is necessary to introduce a new signaling method of allowing a different TA value for a different panel.

A unit in which a common TA value is shared/not shared may not be matched with a hardware implementation for an actual panel. For example, some panels may share the same TA value although they are plural panels if the panels have been well calibrated in a way to be internally and/or geographically close. As another example, each panel may generate a plurality of UL (analog) beams or may be configured with a plurality of UL antenna subsets. There is a possibility that panels may have very different channel characteristics for each different beam (set) or antenna subset although the panels belong to the same panel depending on a UE implementation method.

For example, if different beams are generated within a panel using different antenna sets and hardware characteristics of the antenna sets are significantly different, the assumption (i.e., one TA value per panel per CC) may be inaccurate. Accordingly, there is proposed to define a common term (i.e., UL synchronization unit (USU)) indicating a group of UL antenna ports and/or a group of physical UL channels that are synchronized (in relation to UL timing).

The USU may correspond to one or more UL panels, one or more UL beams, or a group of UL antennas within UL panels depending on different UE implementations.

Hereinafter, a method of setting a plurality of TA values (or TA offset values) upon multiple USUs-based uplink transmission (per CC or per BWP), which is proposed in the present disclosure, is specifically described through related drawings and proposals.

Hereinafter, USU definition and related contents are described.

A common term "UL synchronization unit (USU)" that associates/groups UL antenna ports (APs) and/or physical UL channels to which a common TA value is applied within a CC (or within a BWP) may be defined.

The USU may include UL antenna ports (APs) having different RS/channel types in addition to the same RS/channel type.

For example, the USU may include a set of SRS APs (or SRS resources), a set of PUCCH DMRS APs (or PUCCH resources), a set of PUSCH DMRS APs (or PUSCH resources) and/or a set of PRACH preamble/resources.

Grouped APs/channels may share a common TA value per CC/BWP, and not-grouped APs/channels may have different TA values per CC/BWP. That is, the USU may be a unit for APs/channels that share a common TA value.

The USU may mean one or multiple UL panels, one or multiple UL beams, or an UL antenna group within an UL panel.

Most of information on the aforementioned USU may be provided by RRC signaling so that it is not frequently changed.

However, a specific type of APs/channels associated with the USU may need to be more frequently changed compared to other methods depending on panel activation/deactivation, a wireless channel state, etc.

For example, association between the USUs of PUCCHs/PUSCHs (APs) needs to be more frequently changed than association between the USUs of SRSs/PRACHs.

Therefore, lower layer signaling (e.g., MAC CE and/or DCI) rather than the RRC layer may be used to change USU mapping for APs/channels more rapidly and frequently.

FIG. 18 is a diagram illustrating a concept of a USU proposed in the present disclosure.

The USU may be interpreted as the same meaning as a panel, but is more accurately a concept corresponding to multiple panels. In this case, as illustrated in FIG. 18, the USU may mean an antenna (port) group at a specific location.

In a vehicle (vehicle UE) of FIG. 18, four USUs 1801, 1802, 1803, and 1804 are illustrated. Each of the USUs may correspond to an antenna group including two antennas (or antenna ports).

Furthermore, the aforementioned contents are described based on a transmission unit (e.g., USU) related to the transmission and reception of uplink, but the corresponding contents may also be extended and applied to a reception unit (e.g., a downlink synchronization unit (DSU)) related to the transmission and reception of downlink.

Furthermore, in the present disclosure, the USU may indicate a group of UL antenna ports, a group of UL resources, a panel, etc. which has common properties (e.g., a common TA value and a common power control parameter). That is, the panel in the present disclosure may correspond to the above-described USU.

For example, the panel described with reference to the present disclosure may be denoted as and/or substituted with at least one USU, at least one uplink transmission entity (UTE), at least one UTE group, at least one panel, at least one panel group, at least one beam, at least one beam group, at least one antenna (or antenna port), at least one antenna group (or antenna port group), etc. Furthermore, in the present disclosure, an antenna or an antenna port may be a physical or logical antenna or antenna port.

As described above, the UL transmission scheme in the NR system may be divided into the codebook (CB)-based UL scheme and the non-codebook (NCB)-based UL scheme. In particular, the codebook-based UL scheme may be considered to be an operation based on a single-panel UL scheme because a single SRI is only permitted to be indicated upon UL scheduling. Furthermore, since the best SRI may be dynamically indicated in an UL grant, there may be an effect in that a corresponding single-panel can be instantaneously and dynamically selected.

Hereinafter, the present disclosure proposes methods of efficiently supporting multi-beam and/or multi-panel based operations with respect to uplink and/or downlink transmission and reception between a BS and a UE in the NR system.

Embodiments described in the present disclosure are merely distinguished for convenience of description and do not limit methods described in the present disclosure. For example, some components of a certain embodiment may be substituted with components of another embodiment or they may be combined and applied. For example, embodiments described below may be independently applied or configured as one or more combinations and applied.

First Embodiment—Method of Configuring Transmission and Reception Depending on Purposes and/or Characteristics of Panels In a multi-beam based operation, homogeneous type of different types of antennas may be configured for respective panels of a UE. For example, one panel may be composed of a single/X-pol omni-antenna and another panel may be composed of multiple antennas.

That is, antenna structures may be independent or different for panels. In view of this, a UE may be configured and/or instructed to initiate selective (or joint or simultaneous) uplink transmission using homogeneous type transmission (Tx) panels (or antenna groups) in the same and/or similar forms. And/or the UE may be configured and/or instructed to initiate selective (or joint or simultaneous) uplink transmission using independent and/or heterogeneous type transmission panels (or antenna groups).

Hereinafter, in the present embodiment of the present disclosure, methods of configuring and/or indicating panels by classifying the panels according to purpose or the like on the assumption that a UE has heterogeneous transmission panels will be proposed.

For example, panels of a UE may be classified into a primary panel and a secondary panel according to uplink transmission purpose or the like. That is, antenna groups of the UE may be classified into a primary antenna group and a secondary antenna group according to uplink transmission purpose or the like. Accordingly, the effect of efficient uplink transmission can be obtained when a case in which power allocation to the panels and capability of the panels are differently set is considered.

Although methods are described based on only two types of classified panels (or antenna groups) in the present disclosure, methods which will be described below can be extended and applied for three or more types of classified panels (or antenna groups).

For example, the primary panel (or primary antenna group) may be configured for connectivity purpose and mobility-management purpose. ABS may configure and/or indicate the primary panel for a UE, and the primary panel may be limited and/or configured to be used all the time (i.e., default) in joint uplink transmission and at least one of other panels, that panels (e.g., secondary panels) other than the primary panel may be scheduled and/or indicated to be used for the joint uplink transmission. For example, an operation in which selective (or joint or simultaneous) uplink transmission only from panels (e.g., secondary panels) other than the primary panel for the purpose of throughput boosting is scheduled and/or indicated may be considered since an independently controlled specific transmission mode is present (or defined).

When a case in which the aforementioned primary panel (or primary antenna group, primary antenna set, etc.) and secondary panels (or secondary antenna groups, secondary antenna sets, etc.) are defined, configured, and/or identified is assumed, operations according to the following examples may be defined, configured, and/or identified for a UE. Methods which will be described below are merely for convenience of description and they may be independently applied or one or more thereof may be combined and applied.

For example, the primary panel may be configured and/or indicated such that it is used for PRACH transmission, PUCCH transmission, PUSCH transmission, and/or SRS transmission. On the other hand, the secondary panels may be configured and/or indicated such that they are used for PUSCH transmission, SRS transmission, and/or PUCCH transmission (e.g., transmission of a PUCCH carrying uplink control information with low priority).

For example, when a BS configures (and/or indicates) SRS transmission according to SRS resources (or SRS resource set) (for beam management purpose), PUSCH transmission, and/or PUCCH transmission, the BS may indicate information on whether to perform transmission using the primary panel using a specific L-K-bit (e.g., K=1) indicator. The K-bit indicator may be explicitly present in a field in downlink control information (DCI) or implicitly indicated by another (or existing) field in the DCI (particularly, in the case of aperiodic transmission indication and/or triggering). In other words, the K-bit indicator may be configured as a separate field in the DCI or defined or indicated by a codepoint of the existing field.

And/or the K-bit indicator may be configured and/or indicated through layer-2 (L2) signaling (e.g., MAC-CE based signaling). In this case, the K-bit indicator may be used, configured, and/or defined for down-selection purpose and/or activation purpose of a specific field and/or candidate states in DCI.

And/or the K-bit indicator may be configured and/or indicated through higher layer signaling (e.g., RRC signaling). In this case, the K-bit indicator may be used, configured, and/or defined for down-selection purpose and/or activation purpose of candidate values in a specific field and/or a message MAC-CE.

For example, when retransmission for specific uplink transmission previously performed by a UE is required (e.g., when NACK information is generated and/or reported), the UE may be defined, configured, and/or instructed to transmit a PUSCH for retransmission through the primary panel (at all time). For example, for retransmission for a fallback operation, the primary panel may be configured and/or indicated to be used.

For example, a specific PUCCH format may be configured to be transmitted through the primary panel at all time. For example, an SR request and/or a PUCCH format for ACK/NACK may be configured and/or instructed to be transmitted through the primary panel.

Further, the above-described examples may be extended (or modified) and applied to downlink reception in a similar manner. In other words, a case in which a primary panel (or primary antenna group, primary antenna set, etc.) and a secondary panel (or secondary antenna group, secondary antenna set, etc.) are defined, configured, and/or identified from the viewpoint of a downlink reception panel (or downlink reception antenna group, downlink reception antenna set, etc.) may be assumed. In this case, operations according to the following examples may be defined, configured, and/or identified for a UE. Methods which will be described below are merely for convenience of description and they may be independently applied or one or more thereof may be combined and applied.

For example, the primary panel may be configured and/or instructed to perform any downlink reception. On the other hand, the secondary panel may be configured and/or instructed to receive a UE-specific PDCCH and/or PDSCH. Further, with respect to reception of the UE-specific PDCCH and/or PDSCH, the secondary panel may be configured and/or instructed to receive synchronization signal blocks (SSBs) and/or CSI-RSs for beam management (BM) and/or channel state measurement.

For example, when quasi co-location (QCL) for the PDCCH and/or the PDSCH is indicated or configured, an operation of indicating whether a reception panel (or reception antenna group or reception antenna set) of a UE is a primary panel may be defined or configured. Accordingly, a BS can control a panel (or antenna group or antenna set) through which a UE receives specific downlink transmission.

For example, an operation of indicating information on whether corresponding feedback information is assumed to be received through the primary panel during beam management and/or CSI feedback (i.e., CSI report) of a UE may be defined, configured, and/or instructed. Otherwise, information related to assumption about reception of the feedback information for both the primary panel and the secondary panel may be configured to be reported (by the UE).

As described above, a multi-panel operation efficient in terms of resources and/or signaling overhead can be performed according to transmission and reception through classification into the primary panel and the secondary panel.

FIG. 19 is a flowchart illustrating an operation of a UE that performs uplink transmission based on one or more panels in a wireless communication system to which methods proposed in the present disclosure are applicable. FIG. 19 is merely for convenience of description and does not limit the scope of the present disclosure. A method and/or a procedure described in FIG. 19 can be implemented in various devices as described in FIG. 23 to FIG. 27.

Referring to FIG. 19, a case in which a UE and/or a BS perform uplink transmission and reception based on panel classification in the first embodiment of the present disclosure is assumed.

The UE (e.g., 2210 and/or 2220 in FIG. 23 to FIG. 27) may receive configuration information related to uplink transmission from the BS (e.g., 2210 and/or 2220 in FIG. 23 to FIG. 27) (S1905). The configuration information may include general configuration information related to uplink transmission and/or configuration information on panels related to uplink transmission. For example, the configuration information may be configured based on a first panel type (e.g., type to which the aforementioned primary panel belongs) related to uplink transmission and a second panel type (e.g., type to which the aforementioned secondary panel belongs). In this case, a panel may be substituted with an antenna group, an antenna set, a beam group, etc. and analyzed, as described above.

For example, the operation of the UE (e.g., 2210 and/or 2220 in FIG. 23 to FIG. 27) to receive the configuration information from the BS (e.g., 2210 and/or 2220 in FIG. 23 to FIG. 27) in step S1905 may be implemented by devices in FIG. 23 to FIG. 27 which will be described below. For example, referring to FIG. 23, at least one processor 102 can control at least one transceiver 106 and/or at least one memory 104 to receive the configuration information, and the at least one transceiver 106 can receive the configuration information from the BS.

The UE (e.g., 2210 and/or 2220 in FIG. 23 to FIG. 27) may perform the uplink transmission through panel(s) corresponding to at least one of the first panel type and the second panel type (S1910). For example, the UE may perform SRS transmission, PUCCH transmission, PUSCH transmission and/or PRACH transmission based on at least one of a primary panel and a secondary panel as in the above-described method. Here, the priority of the first panel type may be assumed to be higher than that of the second panel type.

For example, the operation of the UE (e.g., 2210 and/or 2220 in FIG. 23 to FIG. 27) to perform the uplink transmission to the BS (e.g., 2210 and/or 2220 in FIG. 23 to FIG. 27) in step S1910 may be implemented by devices in FIG. 23 to FIG. 27 which will be described below. For example, referring to FIG. 23, at least one processor 102 can control at least one transceiver 106 and/or at least one memory 104 to perform the uplink transmission, and the at least one transceiver 106 can perform the uplink transmission to the BS.

Furthermore, with respect to the aforementioned operation of FIG. 19, the UE (e.g., 2210 and/or 2220 in FIG. 23 to FIG. 27) may receive scheduling information for the uplink transmission through one of downlink control information (DCI) and a medium access control-control element (MAC-CE). In this case, the scheduling information may include information representing one of the first panel type and the second panel type to be applied to the uplink transmission.

FIG. 20 is a flowchart illustrating an operation of a base station (BS) that receives an uplink channel and/or an uplink signal transmitted based on one or more panels in a wireless communication system to which the methods proposed in the present disclosure are applicable. FIG. 20 is merely for convenience of description and does not limit the scope of the present disclosure. A method and/or a procedure described in FIG. 20 can be implemented in various devices as described in FIG. 23 to FIG. 27.

Referring to FIG. 20, a case in which a UE and/or a BS perform uplink transmission and reception based on panel classification in the first embodiment of the present disclosure is assumed.

The BS (e.g., 2210 and/or 2220 in FIG. 23 to FIG. 27) may transmit configuration information related to transmission of an uplink channel and/or an uplink signal to the UE (e.g., 2210 and/or 2220 in FIG. 23 to FIG. 27) (S2005). The configuration information may include general configuration information related to uplink transmission and/or configuration information on panels related to uplink transmission. For example, the configuration information may be configured based on a first panel type (e.g., type to which the aforementioned primary panel belongs) related to uplink transmission and a second panel type (e.g., type to which the aforementioned secondary panel belongs). In this case, a panel may be substituted with an antenna group, an antenna set, a beam group, etc. and analyzed, as described above.

For example, the operation of the BS (e.g., 2210 and/or 2220 in FIG. 23 to FIG. 27) to transmit the configuration information to the UE (e.g., 2210 and/or 2220 in FIG. 23 to FIG. 27) in step S2005 may be implemented by devices in FIG. 23 to FIG. 27 which will be described below. For example, referring to FIG. 23, at least one processor 102 can control at least one transceiver 106 and/or at least one memory 104 to transmit the configuration information, and the at least one transceiver 106 can transmit the configuration information to the UE.

The BS (e.g., 2210 and/or 2220 in FIG. 23 to FIG. 27) may receive the uplink channel and/or the uplink signal transmitted through panel(s) of the UE corresponding to at least one of the first panel type and the second panel type (S2010). For example, the BS may receive an SRS, a PUCCH, a PUSCH and/or a PRACH transmitted based on at least one of a primary panel and a secondary panel as in the above-described method. Here, the priority of the first panel type may be assumed to be higher than that of the second panel type.

For example, the operation of the BS (e.g., 2210 and/or 2220 in FIG. 23 to FIG. 27) to receive the uplink channel and/or the uplink signal from the UE (e.g., 2210 and/or 2220 in FIG. 23 to FIG. 27) in step S2010 may be implemented by devices in FIG. 23 to FIG. 27 which will be described below. For example, referring to FIG. 23, at least one processor 102 can control at least one transceiver 106 and/or at least one memory 104 to receive the uplink channel and/or the uplink signal, and the at least one transceiver 106 can receive the uplink channel and/or the uplink signal from the UE.

Furthermore, with respect to the aforementioned operation of FIG. 20, the BS (e.g., 2210 and/or 2220 in FIG. 23 to FIG. 27) may transmit scheduling information for transmission of the uplink channel and/or the uplink signal through one of downlink control information (DCI) and a medium access control-control element (MAC-CE). In this case, the scheduling information may include information representing one of the first panel type and the second panel type to be applied to the uplink transmission.

In addition, with respect to the operations of FIG. 19 and FIG. 20, the panel used for the uplink transmission may belong to the first panel type or the second panel type based on usage (or purpose) of the uplink transmission.

Furthermore, with respect to the operations of FIG. 19 and FIG. 20, when the uplink transmission is SRS transmission for beam management (BM), the panel may belong to the first panel type. Further, the first panel type may be set for at least one of a PRACH (Physical Random Access Channel), a PUCCH (Physical Uplink Control Channel), PUSCH (Physical Uplink Shared Channel), and an SRS (Sounding Reference Signal), and the second panel type may be set for at least one of the PUCCH, the PUSCH and the SRS.

Moreover, with respect to the operations of FIG. 19 and FIG. 20, when the uplink transmission is PUCCH transmission for transmission of an SR (Scheduling Request) or HARQ-ACK information, the panel may belong to the first panel type. Further, when the uplink transmission is PUSCH transmission for retransmission of uplink transmission previously performed by the UE, the panel may belong to the first panel type.

In addition, with respect to the operations of FIG. 19 and FIG. 20, when the uplink transmission is joint transmission for multiple BSs, the first panel type may be a default panel type preset for the joint transmission.

Second Embodiment—Method of Configuring Panel and/or Beam Based on Hierarchical Structure In the present embodiment of the present disclosure, a method of configuring and/or indicating, by a BS, a panel and/or a beam to be used for uplink transmission of a UE to the UE in a hierarchical manner in uplink transmission of the UE will be described.

For example, in a multi-panel operation related to uplink transmission and reception, one or multiple uplink beams may be selected from a specific UE panel for PUSCH transmission (e.g., with respect to PUSCH). In addition, when simultaneous transmission over multiple panels is considered, one or multiple uplink beams may be selected for each panel for PUSCH transmission. Further, simultaneous transmission over multiple panels is not considered, one or multiple uplink beams may be selected for each panel for PUSCH transmission.

In addition, in a multi-panel operation related to PUSCH transmission as in the aforementioned example, a method in which power sharing between multiple panels is not applied may be considered. In this case, a UE may be defined, configured, and/or instructed to independently report information such as currently allocated power (and/or remaining power that can be additionally allocated or transmitted), for example, a power headroom report (PHR), for each specific panel for the same frequency band, component carrier (CC) and/or bandwidth part (BWP). As mentioned above, the specific panel may be substituted with a specific antenna group, a specific RS (e.g., SRS) port group, a specific RS port resource, a specific RS port set, etc.

Furthermore, with respect to the multi-panel operation related to PUSCH transmission, codebook-based transmission (CB transmission) and non-codebook-based transmission (NCB transmission) in the above-described PUSCH transmission related procedure may be considered.

First, in the case of CB transmission, when an SRS resource set is composed of two SRS resources, a method of indicating a UE transmission panel to which each SRS resource is mapped and indicating whether SRS is transmitted through each SRS resource needs to be considered. For example, the two SRS resources may be mapped to the same transmission panel and transmitted through other beams according to UE implementation. Here, the other beams may be indicated through explicit information (e.g., a value of an SRI field of a UL grant). Similarly, a panel to be used by a UE for PUSCH transmission in the case of CB transmission may be explicitly configured and/or indicated.

For example, as a method of indicating selection of multiple SRS resources, a method of adding (digital) precoding information indicated by a TRI/TPMI field on port virtualization (and/or transmission beam) at the time of the most recent SRS transmission to an SRS resource ID corresponding to "SRI value" indicated by the UL grant to generate a PUSCH layer and/or port and performing uplink transmission may be considered.

On the other hand, in the case of NCB transmission, when each SRS resource (limited to 1 port) configured in an SRS resource set is composed of other spatial relation information values according to BS (e.g., gNB) implementation, a certain degree of multi-beam based uplink transmission may be applied to existing methods. However, a main enabler of NCB transmission which configures an associated CSI-RS to determine an SRS precoder can be supported only when it configures the associated CSI-RS at an SRS resource set level. Accordingly, single-beam-based NCB transmission can be interpreted as a method of indicating a digital precoder through SRI in a specific DCI format (e.g., DCI format 0_1). Similarly to the aforementioned CB transmission case, enhancement for NCB transmission in terms of support of the multi-beam operation may be required along with configuration of multiple SRS resource sets for NCB transmission with respect to the UL grant.

In this regard, the embodiment of the present disclosure proposes a hierarchical configuration method that is a method of configuring and/or indicating specific SRS resource ID(s) through the aforementioned UL grant.

For example, the hierarchical configuration method can be applied to a higher layer signaling message (e.g., RRC message) for a configured grant method such as UL DCI and/or semi-persistent scheduling for scheduling NCB transmission. As a specific example, specific SRS resource ID(s) such as an SRI field can be configured and/or indicated in the UL DCI and/or the higher layer signaling message. In this case, information on a certain SRS resource set in which specific SRS resource(s) is indicated may be configured and/or indicated to the UE through (paired) indication and/or configuration form such as {SRS resource set ID, SRI}.

"SRS resource set ID" may indicate the aforementioned certain SRS resource set and "SRI" may indicate the specific SRS resource(s) in the certain SRS resource set. In other words, a method of indicating and/or configuring an SRS resource ID in a certain SRS resource set by additionally configuring the specific SRS resource set ID may be considered. For example, the SRS resource set ID may indicate the aforementioned panel (or antenna group) and the SRS resource ID(s) may indicate beam(s) in the panel. That is, the SRS resource set ID may correspond to information for identifying the panel (e.g., panel ID) and the SRS resource ID(s) may correspond to information for identifying the beam(s) (e.g., beam ID, ID of a resource related to the beam).

In the methods proposed in the present disclosure, the aforementioned hierarchical configuration method can be indicated or configured to a UE, and the UE may be configured to previously report information on whether the UE has implemented an operation related thereto to a BS. In this case, the information may be reported in the form of UE capability information as in the following example.

For example, the UE capability information may include information on the number of SRS resource set configurations necessary for the UE for NCB transmission, information on the number of SRS resource or SRS port configurations in each SRS resource set, and information on the number of SRS resource set configurations that can be simultaneously transmitted. Here, the SRS resource set may correspond to a transmission panel of the corresponding UE, and the SRS resource or the SRS port may correspond to a transmission beam in the transmission panel.

Furthermore, with respect to the simultaneous transmission, a specific restriction and/or a specific rule in which a BS should not arbitrarily indicate a combination of SRS resource sets for applying beam and port virtualization during PUSCH scheduling among all the configured SRS resource sets, and only specific available combinations among the corresponding SRS resource sets should be simultaneously indicated may be defined or set. For example, a restriction and/or a rule in which simultaneous transmission can be indicated only for lower (higher) half indexes of SRS resource set IDs may be defined.

FIG. 21 illustrates an example of signaling between a BS and a UE that perform uplink transmission and reception in a wireless communication system to which the methods proposed in the present disclosure are applicable. FIG. 21 is merely for convenience of description and does not limit the scope of the present disclosure. A method and/or a procedure described in FIG. 21 can be implemented in various devices as described in FIG. 23 to FIG. 27 which will be described later.

Referring to FIG. 21, a case in which a BS and a UE perform uplink transmission and reception based on the hierarchical configuration method in the above-described second embodiment is assumed. For example, uplink transmission may be non-codebook-based PUSCH transmission.

A UE (e.g., 2210 and/or 2220 in FIG. 23 to FIG. 27) may transmit UE capability information related to uplink transmission (e.g., the UE capability information in the above-described second embodiment) to a BS (e.g., 2210 and/or 2220 in FIG. 23 to FIG. 27) (S2105). Similarly, the BS (e.g., 2210 and/or 2220 in FIG. 23 to FIG. 27) may receive the UE capability information related to uplink transmission from the UE (e.g., 2210 and/or 2220 in FIG. 23 to FIG. 27). For example, the UE capability information may include at least one of information on the number of supportable SRS resource sets of the UE for the uplink transmission and information on the number of SRS resources that can be included in each SRS resource set. In addition, the UE capability information may further include information on a maximum number of SRS resource sets through which the UE can perform simultaneous transmission. Further, the maximum number of SRS resource sets may be determined using a rule set in advance based on beam virtualization and port virtualization related to scheduling of the uplink transmission.

For example, the operation of the UE (e.g., 2210 and/or 2220 in FIG. 23 to FIG. 27) to transmit the UE capability information to the BS (e.g., 2210 and/or 2220 in FIG. 23 to FIG. 27) in step S2105 may be implemented by devices in FIG. 23 to FIG. 27 which will be described below. Similarly, the operation of the BS (e.g., 2210 and/or 2220 in FIG. 23 to FIG. 27) to receive the UE capability information from the UE (e.g., 2210 and/or 2220 in FIG. 23 to FIG. 27) in step S2105 may be implemented by devices in FIG. 23 to FIG. 27 which will be described below. For example, referring to FIG. 23, at least one processor 102 can control at least one transceiver 106 and/or at least one memory 104 to transmit and/or receive the UE capability information, and the at least one transceiver 106 can transmit and/or receive the UE capability information.

The UE (e.g., 2210 and/or 2220 in FIG. 23 to FIG. 27) may receive configuration information related to uplink transmission from the BS (e.g., 2210 and/or 2220 in FIG. 23 to FIG. 27) (S2110). Similarly, the BS (e.g., 2210 and/or 2220 in FIG. 23 to FIG. 27) may transmit the configuration information related to uplink transmission to the UE (e.g., 2210 and/or 2220 in FIG. 23 to FIG. 27). Here, the configuration information may be configured based on the UE capability information (i.e., such that it does not infringe the UE capability information). Further, the configuration information may include information on one or more SRS resource sets and one or more SRS resources related to the uplink transmission.

For example, the operation of the UE (e.g., 2210 and/or 2220 in FIG. 23 to FIG. 27) to receive the configuration information from the BS (e.g., 2210 and/or 2220 in FIG. 23 to FIG. 27) in step S2110 may be implemented by devices in FIG. 23 to FIG. 27 which will be described below. Similarly, the operation of the BS (e.g., 2210 and/or 2220 in FIG. 23 to FIG. 27) to transmit the configuration information to the UE (e.g., 2210 and/or 2220 in FIG. 23 to FIG. 27) in step S2110 may be implemented by devices in FIG. 23 to FIG. 27 which will be described below. For example, referring to FIG. 23, at least one processor 102 can control at least one transceiver 106 and/or at least one memory 104 to receive and/or transmit the configuration information, and the at least one transceiver 106 can receive and/or transmit the configuration information.

The UE (e.g., 2210 and/or 2220 in FIG. 23 to FIG. 27) may receive scheduling information related to the uplink transmission from the BS (e.g., 2210 and/or 2220 in FIG. 23 to FIG. 27) (S2115). Similarly, the BS (e.g., 2210 and/or 2220 in FIG. 23 to FIG. 27) may transmit the scheduling information related to the uplink transmission to the UE (e.g., 2210 and/or 2220 in FIG. 23 to FIG. 27). Here, the scheduling information may be transmitted through downlink control information. The downlink control information may include information indicating an SRS resource set and an SRS resource from among one or more SRS resource sets and one or more SRS resources. For example, the SRS resource set and the SRS resource may be configured as a pair, and the SRS resource may belong to the SRS resource set. The SRS resource set may be indicated by an SRS resource set identifier and the SRS resource may be indicated by an SRS resource indicator (SRI) value (e.g., {SRS resource set ID, SRI(s)}).

For example, the operation of the UE (e.g., 2210 and/or 2220 in FIG. 23 to FIG. 27) to receive the scheduling information from the BS (e.g., 2210 and/or 2220 in FIG. 23 to FIG. 27) in step S2115 may be implemented by devices in FIG. 23 to FIG. 27 which will be described below. Similarly, the operation of the BS (e.g., 2210 and/or 2220 in FIG. 23 to FIG. 27) to transmit the scheduling information to the BS (e.g., 2210 and/or 2220 in FIG. 23 to FIG. 27) in step S2115 may be implemented by devices in FIG. 23 to FIG. 27 which will be described below. For example, referring to FIG. 23, at least one processor 102 can control at least one transceiver 106 and/or at least one memory 104 to receive and/or transmit the scheduling information, and the at least one transceiver 106 can receive and/or transmit the scheduling information.

The UE (e.g., 2210 and/or 2220 in FIG. 23 to FIG. 27) may perform the uplink transmission to the BS (e.g., 2210 and/or 2220 in FIG. 23 to FIG. 27) based on the SRS resource set and the SRS resource (S2120). Similarly, the BS (e.g., 2210 and/or 2220 in FIG. 23 to FIG. 27) may receive an uplink channel and/or an uplink signal transmitted based on the SRS resource set and the SRS resource from the UE (e.g., 2210 and/or 2220 in FIG. 23 to FIG. 27). Here, being based on the SRS resource set and the SRS resource may mean using a panel corresponding to the SRS resource set and a beam corresponding to the SRS resource in the corresponding panel.

For example, the operation of the UE (e.g., 2210 and/or 2220 in FIG. 23 to FIG. 27) to perform the uplink transmission to the BS (e.g., 2210 and/or 2220 in FIG. 23 to FIG. 27) in step S2120 may be implemented by devices in FIG. 23 to FIG. 27 which will be described below. Similarly, the operation of the BS (e.g., 2210 and/or 2220 in FIG. 23 to FIG. 27) to receive the uplink channel and/or the uplink signal from the UE (e.g., 2210 and/or 2220 in FIG. 23 to FIG. 27) in step S2120 may be implemented by devices in FIG. 23 to FIG. 27 which will be described below. For example, referring to FIG. 23, at least one processor 102 can control at least one transceiver 106 and/or at least one memory 104 to perform the uplink transmission and reception, and the at least one transceiver 106 can perform the uplink transmission and reception.

Third Embodiment—Method of Configuring Panel Switching Between Multiple Panels

In addition, panel switching applicable to panels may be considered with respect to a multi-panel based operation described in the present embodiment. In this case, a method for supporting a gap period (GP) required for the panel switching may need to be considered.

For example, in the case of SRS transmission, a case in which switching delay between N (e.g., N=2) SRS resource sets for beam management is present is assumed. Here, an SRS resource set may correspond to a panel of a UE. In this case, the SRS resource sets need to be spaced from each other in consideration of the switching delay (i.e., the gap period needs to be guaranteed). In this case, information on the gap period may need to be reported as UE capability information, and the BS may be restricted such that it does not perform scheduling that infringes the gap period. Here, other uplink transmissions (e.g., PUCCH transmission and PUSCH transmission) may be configured or restricted such that they are impossible in the gap period.

For example, in the case of PUSCH transmission, the UE and/or the BS may be defined or configured to follow the operation for the gap period related to SRS transmission in the above-described example through SRI information indicated for scheduling of the PUSCH transmission.

For example, in the case of PUCCH transmission, a case in which the UE is configured and/or instructed to transmit a first PUCCH resource (e.g., PUCCH resource #1) through a first panel (e.g., panel #1) and configured and/or instructed transmit a second PUCCH resource (e.g., PUCCH resource #2) through a second panel (e.g., panel #2) is assumed. Here, a panel may be identified by a specific beam or a specific RS (e.g., an SRS resource, an SRS resource set, etc.).

In the case of the PUCCH transmission, when a transmission timing configuration interval between the two (or more) PUCCH transmissions (e.g., an interval between transmission through the first PUCCH resource and transmission through the second PUCCH resource) is short, an operation of ignoring (i.e., dropping) one side may be defined or configured. For example, preceding PUCCH transmission may be preferentially performed and subsequent PUCCH transmission may be ignored (i.e., dropped). Alternatively, only specific transmission symbols of the PUCCH which do not satisfy a condition for switching delay (i.e., gap period condition related to panel switching delay) may be partially ignored (i.e., dropped), and PUCCH transmission based on a specific rule (e.g., a PUCCH format in a short form, i.e., a short PUCCH format) may be performed on a specific area in which PUCCH transmission can be performed. As another example, subsequent PUCCH transmission may be preferentially performed and preceding PUCCH transmission may be ignored (i.e., dropped). Alternatively, only specific transmission symbols of the PUCCH which do not satisfy a condition for switching delay (i.e., gap period condition related to panel switching delay) may be partially ignored (i.e., dropped), and PUCCH transmission based on a specific rule (e.g., a PUCCH format in a short form, i.e., a short PUCCH format) may be performed on a specific area in which PUCCH transmission can be performed.

With respect to the above-described methods, the UE may report (or transmit) UE capability information (e.g., information related to panel switch) to the BS. In addition, the UE may receive configuration information and/or scheduling indication for PUSCH transmission and/or PUCCH transmission that do not infringe the reported UE capability information from the BS and perform the PUSCH transmission and/or the PUCCH transmission through the configuration information and/or the scheduling indication. Similarly, the BS may receive the UE capability information (e.g., information related to panel switch) from the UE. In addition, the BS may transmit configuration information and/or scheduling indication for PUSCH transmission and/or PUCCH transmission that satisfy the aforementioned panel switching related gap period condition to the UE based on the received UE capability information and receive a PUSCH and/or a PUCCH from the UE.

Furthermore, the operations and/or the methods described in the present embodiment of the present disclosure may be implemented by devices in FIG. 23 to FIG. 27 which will be described below.

Fourth Embodiment—Uplink Beam Sweeping Method in Consideration of Slot Aggregation In the NR system, an autonomous beam sweeping operation of a UE can be considered to guarantee that a BS efficiently uses beam sweeping uplink transmission of the UE for various purposes. However, improvement of the mechanism of the autonomous beam sweeping operation of the UE may be desirable. For example, the beam sweeping operation may be used for downlink beam management based on beam correspondence of the BS as well as uplink reception of the BS.

The present embodiment of the present disclosure proposes a method of configuring and/or indicating beam sweeping for a PUSCH and/or a PUCCH in consideration of a transmission time unit (e.g., a slot and the like) to efficiently perform uplink beam sweeping. Specifically, in the present embodiment of the present disclosure, a method of indicating beam sweeping (or beam cycling) of a PUSCH scheduled by DCI, a method of indicating beam sweeping (or beam cycling) for each slot instance of a PUSCH based on SPS, and/or a method of indicating beam sweeping (or beam cycling) of PUCCH transmission for transmitting ACK/NACK information of a UE for specific downlink (e.g., PDSCH) reception (e.g., symbol-level beam sweeping may be configured and/or indicated) will be described.

A case in which a multi-slot based PUSCH is configured (and/or scheduled, or indicated) for the purpose of diversity gain is assumed. For example, the multi-slot based PUSCH may be a PUSCH taking into slot aggregation account. In this case, a method of independently configuring and/or indicating spatial relation information to be applied by a UE to the configured multi-slot based PUSCH for each slot index may be considered. For example, the spatial relation information may include at least one of an SRS resource identifier (SRS resource ID or SRS resource index), a CSI-RS resource identifier (CSI-RS resource ID or CSI-RS resource index), and/or synchronization signal (SSB) identifier (SSB ID or SSB index). Accordingly, a BS can independently (and/or flexibly) configure a beam to be applied by a UE at the time of PUSCH transmission for each slot during multi-slot based PUSCH scheduling.

In the aforementioned method of configuring and/or indicating a beam for the multi-slot based PUSCH, the following exemplary methods can be applied.

For example, local beam sweeping based on (one) anchor beam may be considered. Here, the anchor beam means a beam that is a basis of local beam sweeping and may be substituted with other terms having the corresponding technical meaning. For example, the anchor beam may be indicated by an SRI field value or the like. When a specific anchor beam is configured and/or indicated for each transmission timing (i.e., each slot) of the multi-slot based PUSCH, a method of performing beam sweeping according to a pattern prescribed (and/or configured) on the basis of the specific anchor beam may be considered.

As another example, local beam sweeping based on multiple anchor beams may be considered. Here, the anchor beam means a beam that is a basis of local beam sweeping and may be substituted with other terms having the corresponding technical meaning. For example, the specific multiple anchor beams may be indicated by one or more SRI field values or the like. When a BS indicates two anchor beams for a UE, the UE recognizes the two anchor beams as the start point and the end point of beam sweeping and may apply uplink beam sweeping to the interval therebetween (in the form of an equal beam interval).

In the case of codebook-based transmission (CB transmission) (e.g., codebook-based uplink transmission), TPMI to be applied to SRI(s) for indicating anchor beam(s) may also be independently configured and/or indicated. This may be for more accurate and finer beam indication. TPMI indication accompanied with the SRI(s) may be defined and/or configured as common.

And/or only one SRI (for an anchor beam) is configured and/or indicated, and beam sweeping may be configured and/or indicated in such a manner that the TPMI to be applied along with the SRI conforms to at least one of the above-described methods related to anchor beam(s).

And/or a case in which A (e.g., A=2) coarser beams are configured and/or indicated and B (e.g., B=4) finer beams are configured and/or indicated is assumed. For example, the coarser beams may be analog beams based on SRI(s) and the finer beams may be digital beams based on TPMI(s). In this case, the coarser beams may be applied in such a manner that beam sweeping (beam cycling) is performed on the time domain and the finer beams may be applied in such a manner that beam sweeping (beam cycling) on the frequency domain. In other words, the coarser beams and the finer beams may be defined, configured, and/or indicated in such a manner that beam sweeping (or beam cycling) is performed on different domains (i.e., two-dimensional beam sweeping).

In the case of non-codebook-based transmission (NCB transmission) (e.g., non-codebook-based uplink transmission), a TPMI may be substituted with an SRI and the SRI may be extended to an SRS resource set level and similarly applied in the above-described methods. That is, a hierarchical method as in the above-described second embodiment may be considered.

And/or indication related to SRI(s) in the above-described methods is maintained and beam sweeping according thereto may be performed for the next transmission timing (e.g., next slot, next transmission cycle, etc.). A UE may select a beam and/or a panel of the next transmission timing based on the indication related to SRI(s), or a specific rule for selecting a beam and/or a panel may be defined or configured. For example, when beams corresponding to (SRS resource) indexes 3 and 6 are indicated by SRI(s), a UE can perform beam sweeping using beams corresponding to (SRS resource) indexes 4 and 7 at the next transmission timing.

And/or a case in which A (e.g., A=2) coarser beams are configured and/or indicated and B (e.g., B=4) finer beams are configured and/or indicated is assumed. For example, the coarser beams may be analog beams based on SRI(s) or SRS resource set index(es) and the finer beams may be digital beams based on SRI(s). In this case, the coarser beams may be applied in such a manner that beam sweeping (beam cycling) is performed on the time domain and the finer beams may be applied in such a manner that beam sweeping (beam cycling) on the frequency domain. In other words, the coarser beams and the finer beams may be defined, configured, and/or indicated in such a manner that beam sweeping (or beam cycling) is performed on different domains (i.e., two-dimensional beam sweeping).

In addition, although the present embodiment of the present disclosure has been described based on PUSCH transmission, the methods may be similarly extended and applied to PUCCH transmission. In the case of PUCCH transmission, a configuration and/or activation/deactivation of a control resource set (CORESET), a PUCCH format may be considered for beam sweeping.

With respect to the above-described methods, a UE may report (or transmit) at least one piece of UE capability related information to a BS. Furthermore, the UE may receive configuration information and/or scheduling information for at least one beam sweeping operation related to the above-described methods. For example, the configuration information and/or the scheduling information may include information on anchor beam(s), beam information per slot for PUSCH transmission and/or PUCCH (e.g., PUCCH carrying ACK/NACK information) transmission, etc. Thereafter, the UE may transmit a PUSCH and/or a PUCCH to which beam sweeping has been applied based on the configuration information and/or the scheduling information.

Similarly, the BS may receive at least one piece of UE capability related information related to the above-described methods from the UE. Furthermore, the BS may transmit configuration information and/or scheduling information for at least one beam sweeping operation related to the above-described methods. For example, the configuration information and/or the scheduling information may include information on anchor beam(s), beam information per slot for PUSCH transmission and/or PUCCH (e.g., PUCCH carrying ACK/NACK information) transmission, etc. Thereafter, the BS may receive a PUSCH and/or a PUCCH to which beam sweeping has been applied based on the configuration information and/or the scheduling information.

In addition, the operations and/or the methods described in the present embodiment of the present disclosure may be implemented by devices in FIG. 23 to FIG. 27 which will be described below.

Fifth Embodiment—Method of Configuring Beam Sweeping for PUCCH Transmission

In the fourth embodiment of the present disclosure, the methods of configuring and/or indicating beam sweeping for transmission of a PUCCH carrying ACK/NACK information have been described. In the present embodiment of the present disclosure, methods of configuring beam sweeping for PUCCH transmission for channel state information (CSI) reporting and PUCCH transmission for scheduling request (SR) other than the ACK/NACK information will be described.

First, a beam sweeping method to be applied to a PUCCH for CSI reporting will be described.

A calculated (or derived) channel quality indicator (CQI) value may be considered as a condition that beam weeping is applied during specific PUCCH transmission. In this case, beam weeping may be configured to be applied to PUCCH transmission when the calculated CQI value is lower than a specific (or preset or defined) level. Alternatively, a configuration of CSI (i.e., CSI contents) may be considered as a condition that beam weeping is applied during specific PUCCH transmission. In this case, beam sweeping may be configured to be applied to a PUCCH carrying more important (i.e., high priority) type information. For example, CSI of type 1 may be configured as information with higher priority than CSI of type 2.

Here, a method of configuring and/or instructing a UE to (automatically) apply (associate) different (or sweeping) uplink beams applied to respective symbols of a transmitted PUCCH demodulation reference signal (DMRS) to (with) subsequent specific uplink transmission may be considered. That is, transmission beams may be (automatically) associated such that the UE performs subsequent PUCCH transmission using a beam selected through previously performed beam sweeping. Here, the specific uplink transmission may include at least one of SRS transmission, PUCCH transmission, PUSCH transmission, and/or PRACH transmission.

For example, information for configuring and/or instructing an operation of equally applying a beam applied to previously performed PUCCH transmission (i.e., PUCCH DMRS transmission) to spatial relation information (e.g., RRC information spatial-relation-info) configured for subsequent specific uplink transmission may be additionally applied. The information may be configured and/or indicated in the form of a specific DMRS port index or configured and/or identified as a DMRS corresponding to a specific time instance (e.g., slot instance).

In addition, as a specific condition in which operation methods proposed in the present embodiment of the present disclosure are applied, at least one of the following examples may be configured (indicated and/or applied). Examples described below are merely distinguished for convenience of description, and a configuration of a certain example may be substituted with a configuration of another example or they may be combined and applied. A specific PUCCH in the following examples may mean a PUCCH for CSI reporting.

For example, beam sweeping may be applied to transmission of the aforementioned specific PUCCH when received power information of a specific downlink reference signal (RS) identifier (ID) configured in (and/or associated with) spatial relation information (e.g., RRC information spatial-relation-info) of the specific PUCCH satisfies a preset condition. For example, when the received power information is L1-RSRP (Layer 1-Reference Signal Received Power), a UE may be configured to apply beam sweeping for PUCCH transmission if the L1-RSRP value is lower than a specific value. Here, the L1-RSRP value may be reported and/or measured by the UE or indicated by a BS.

As another example, beam sweeping may be applied to transmission of the aforementioned specific PUCCH only when a specific downlink RS ID (e.g., excepting SSB ID) configured in (and/or associated with) spatial relation information (e.g., RRC information spatial-relation-info) of the specific PUCCH is a downlink RS ID in resource setting associated with CSI reporting setting.

As another example, in the case of multi-slot (i.e., slot aggregation) based PUCCH transmission in the above-described proposed methods, beam sweeping may be applied to PUCCH transmission even in one (i.e., individual) slot. The corresponding beam sweeping may be symbol level beam sweeping. To this end, an operation in which a UE applies an additional omission rule to CSI encoding and then performs repetitive transmission and/or beam sweeping based transmission at a symbol level may be configured and/or instructed. For example, the omission rule may mean a rule of omitting or removing lower-prior CSI contents during CSI encoding. Here, the lower-prior CSI contents may mean part 2 CSI and/or CSI contents corresponding to even numbered (or odd numbered) subbands.

Next, a beam sweeping method to be applied to a PUCCH for SR (i.e., SR PUCCH) will be described.

A method of configuring and/or indicating information on whether to apply the PUCCH for SR through higher layer signaling (e.g., RRC signaling, MAC-CE based signaling, etc.) may be considered.

For example, a case in which PUCCH resources for multiple SRs can be configured is assumed. In this case, a UE may be configured and/or instructed to perform PUCCH transmission by applying only IDs of specific RSs included in transmission configuration indicator (TCI) configuration information of CORESET active for the UE from among RSs configured in (and/or associated with) specific spatial relation information (e.g., RRC information spatial-relation-info) per PUCCH resource as PUCCH resources for SRs And/or candidate RS ID(s) for beam application may be configured per PUCCH resource through higher layer signaling (e.g., RRC signaling). Here, a method of dynamically configuring and/or indicating information on RS(s) used to apply beam sweeping (or beam cycling) and a pattern related to an application timing through MAC-CE based signaling may be applied.

With respect to the above-described methods, the UE may report (or transmit) at least one piece of UE capability related information related to the above-described methods to a BS. In addition, the UE may receive configuration information and/or scheduling information for at least one beam sweeping operation for the PUCCH for CSI reporting and/or SR related to the above-described methods. Thereafter, the UE may transmit the PUCCH based on the configuration information and/or the scheduling information.

Similarly, the BS may receive at least one piece of UE capability related information related to the above-described methods from the UE. In addition, the BS may transmit configuration information and/or scheduling information for at least one beam sweeping operation for the PUCCH for CSI reporting and/or SR related to the above-described methods. Thereafter, the BS may receive the PUCCH based on the configuration information and/or the scheduling information.

Furthermore, the operations and/or the methods described in the present embodiment of the present disclosure may be implemented by devices in FIG. 23 to FIG. 27 which will be described below.

In addition, in the above-described methods of configuring and/or indicating multiple beams for (multi-panel based) PUCCH and/or PUSCH transmission in the embodiments of the present disclosure, the hierarchical configuration method proposed in the second embodiment may be additionally applied.

For example, in the case of PUCCH transmission, a method of configuring and/or indicating a (hierarchical) beam indication method such as {SRS resource set ID, SRI} as a paired configuration information form may be applied per PUCCH resource (in the case of a multi-panel UE). And/or a separate (or independent) beam indication method may be configured/indicated for each explicit panel identifier (e.g., panel ID) form. Here, the panel identifier may be configured per synch-unit (SU) described above, and the beam indication method may be a method of indicating multiple beams (in units of panel).

For example, an operation of configuring and/or instructing a BS to configure and/or indicate information on multiple beams to a UE and configuring and/or instructing the UE to perform simultaneous transmission through a panel determined (or identified) based on the information on the multiple beams may be applied. When the information on the multiple beams configured and/or indicated by the BS includes N (e.g., N=2) pieces of spatial relation information (e.g., additional RS identifier(s) configured and/or indicated therefor), the UE may simultaneously transmit a PUSCH and a PUCCH through N panels.

As described above, the above-described signaling and operations (e.g., the first to fifth embodiments, FIG. 19 to FIG. 21, etc.) between a BS and a UE may be implemented by devices (e.g., FIG. 23 to FIG. 27) which will be described below. For example, the BS may correspond to a first wireless device, a UE may correspond to a second wireless device, and the opposite case may be considered according to circumstances.

For example, the above-described signaling and operations (e.g., the first to fifth embodiments, FIG. 19 to FIG. 21, etc.) between a BS and a UE may be processed by one or more processors (e.g., 102 and 202) in FIG. 23 to FIG. 27, and the above-described signaling and operations (e.g., the first to fifth embodiments, FIG. 19 to FIG. 21, etc.) between a BS and a UE may be stored in a memory (e.g., one or more memories (e.g., 104 and 204) in FIG. 23) in the form of commands/program (e.g., instruction or executable code) for driving the one or more processors (e.g., 102 and 202) in FIG. 23 to FIG. 27.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 22 illustrates a communication system, 22, applied to the present disclosure.

Referring to FIG. 22, a communication system 22 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 2210a, vehicles 2210b-1 and 2210b-2, an eXtended Reality (XR) device 2210c, a hand-held device 2210d, a home appliance 2210e, an Internet of Things (IoT) device 2210f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 2220a may operate as a BS/network node with respect to other wireless devices.

The wireless devices 2210a to 2210f may be connected to the network 300 via the BSs 2220. An AI technology may be applied to the wireless devices 2210a to 2210f and the wireless devices 2210a to 2210f may be connected to the AI server 400 via the network 300. The network 300 may be configured using a 3G network, a 4G (e.g., LTE) network, or a 5G (e.g., NR) network. Although the wireless devices 2210a to 2210f may communicate with each other through the BSs 2220/network 300, the wireless devices 2210a to 2210f may perform direct communication (e.g., sidelink communication) with each other without passing through the BSs/network. For example, the vehicles 2210b-1 and 2210b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 2210a to 2210f.

Wireless communication/connections 150a, 150b, or 150c may be established between the wireless devices 2210a to 2210f/BS 2220, or BS 2220/BS 2220. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Wireless Devices Applicable to the Present Disclosure

FIG. 23 illustrates wireless devices applicable to the present disclosure.

Referring to FIG. 23, a first wireless device 2210 and a second wireless device 2220 may transmit radio signals through a variety of RATs (e.g., LTE and NR). Herein, {the first wireless device 2210 and the second wireless device 2220} may correspond to {the wireless device 2210x and the BS 2220} and/or {the wireless device 2210x and the wireless device 2210x} of FIG. 22.

The first wireless device 2210 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 2220 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 2210 and 2220 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices Applied to the Present Disclosure

FIG. 24 illustrates another example of a wireless device applied to the present disclosure. The wireless device may be implemented in various forms according to a use-case/service (refer to FIG. 24).

Referring to FIG. 24, wireless devices 2210 and 2220 may correspond to the wireless devices 2210 and 2220 of FIG. 23 and may be configured by various elements, components, units/portions, and/or modules. For example, each of the wireless devices 2210 and 2220 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 23. For example, the transceiver(s) 114 may include the one or more transceivers 106 and 106 and/or the one or more antennas 108 and 108 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (2210a of FIG. 22), the vehicles (2210b-1 and 2210b-2 of FIG. 22), the XR device (2210c of FIG. 22), the hand-held device (2210d of FIG. 22), the home appliance (2210e of FIG. 22), the IoT device (2210f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (2220 of FIG. 22), a network node, etc. The wireless device may be used in a mobile or fixed place according to a use-example/service.

In FIG. 24, the entirety of the various elements, components, units/portions, and/or modules in the wireless devices 2210 and 2220 may be connected to each other through a wired interface or at least a part thereof may be wirelessly connected through the communication unit 110. For example, in each of the wireless devices 2210 and 2220, the control unit 120 and the communication unit 110 may be connected by wire and the control unit 120 and first units (e.g., 130 and 140) may be wirelessly connected through the communication unit 110. Each element, component, unit/portion, and/or module within the wireless devices 2210 and 2220 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an implementation example of FIG. 24 will be described in more detail with reference to the drawings.

Portable Device Example to which Present Disclosure is Applied

FIG. 25 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 25, a portable device 2210 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 24, respectively.

The communication unit 110 may transmit/receive a signal (e.g., data, a control signal, etc.) to/from another wireless device and eNBs. The control unit 120 may perform various operations by controlling components of the portable device 2210. The control unit 120 may include an Application Processor (AP). The memory unit 130 may store data/parameters/programs/codes/instructions required for driving the portable device 2210. Further, the memory unit 130 may store input/output data/information, etc. The power supply unit 140a may supply power to the portable device 2210 and include a wired/wireless charging circuit, a battery, and the like. The interface unit 140b may support a connection between the portable device 2210 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Example of AI Device Applied to the Present Disclosure

FIG. 26 illustrates an example of an AI device 100 applied to the present disclosure. The AI device may be implemented as a fixed device or mobile device, such as TV, a projector, a smartphone, PC, a notebook, a terminal for digital broadcasting, a tablet PC, a wearable device, a set-top box (STB), a radio, a washing machine, a refrigerator, a digital signage, a robot, and a vehicle.

Referring to FIG. 26, the AI device 2210 may include a communication unit 110, a control unit 120, a memory 130, an input/output unit 140a/140b, a learning processor 140c, and a sensing unit 140d. Blocks 110~130/140a~140d correspond to block 110~130/140 in FIG. 24, respectively.

The communication unit 110 may transmit and receive wired/wireless signals (e.g., sensor information, user input, learning models, control signals, etc.) to and from external devices such as another AI device (e.g., FIG. 22, 2210x, 2220 or 400) or the AI server (FIG. 22, 400) using wired/wireless communication technology. To this end, the communication unit 110 may transmit information in the memory unit 130 to an external device or transfer a signal received from the external device to the memory unit 130.

The control unit 120 may determine at least one executable operation of the AI device 2210 based on information determined or generated using a data analysis algorithm or a machine learning algorithm. In addition, the control unit 120 may control the components of the AI device 2210 to perform the determined operation. For example, the control unit 120 may request, search for, receive or utilize the data of the learning processor unit 140c or the memory unit 930, and control the components of the AI device 2210 to perform predicted operation or operation, which is determined to be desirable, of at least one executable operation. In addition, the control unit 120 may collect history information including operation of the AI device 2210 or user's feedback on the operation and store the history information in the memory unit 130 or the learning processor unit 940c or transmit the history information to the AI server (FIG. 22, 400). The collected history information may be used to update a learning model.

The memory unit 130 may store data supporting various functions of the AI device 2210. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary to operate/execute the control unit 120.

The input unit 140a may acquire various types of data from the outside of the AI device 2210. For example, the input unit 140a may acquire learning data for model learning, input data, to which the learning model will be applied, etc. The input unit 140a may include a camera, a microphone and/or a user input unit. The output unit 140b may generate video, audio or tactile output. The output unit 140b may include a display, a speaker and/or a haptic module. The sensing unit 140 may obtain at least one of internal information of the AI device 2210, the surrounding environment information of the AI device 2210 and user information using various sensors. The sensing unit 140 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 140c may train a model composed of an artificial neural network using training data. The learning processor unit 140c may perform AI processing along with the learning processor unit of the AI server (FIG. 22, 400). The learning processor unit 140c may process information received from an external device through the communication unit 110 and/or information stored in the memory unit 130. In addition, the output value of the learning processor unit 140*c* may be transmitted to the external device through the communication unit 110 and/or stored in the memory unit 130.

FIG. 27 illustrates an AI server to be applied to the present disclosure.

Referring to FIG. 27, the AI server, 400 in FIG. 22, may mean a device which is trained by an artificial neural network using a machine learning algorithm or which uses a trained artificial neural network. In this case, the AI server 400 is configured with a plurality of servers and may perform distributed processing and may be defined as a 5G network. In this case, the AI server 400 may be included as a partial configuration of the AI device, 2210 in FIG. 26, and may perform at least some of AI processing.

The AI server 400 may include a communication unit 410, a memory 430, a learning processor 440 and a processor 460. The communication unit 410 may transmit and receive data to and from an external device, such as the AI device, 2210 in FIG. 26. The memory 430 may include a model storage unit 431. The model storage unit 431 may store a model (or artificial neural network 431*a*) which is being trained or has been trained through the learning processor 440. The learning processor 440 may train the artificial neural network 431*a* using learning data. The learning model may be used in the state in which it has been mounted on the AI server 400 of the artificial neural network or may be mounted on an external device, such as the AI device, 2210 in FIG. 26, and used. The learning model may be implemented as hardware, software or a combination of hardware and software. If some of or the entire learning model is implemented as software, one or more instructions configuring the learning model may be stored in the memory 430. The processor 460 may deduce a result value of new input data using the learning model, and may generate a response or control command based on the deduced result value.

The AI server 400 and/or the AI device 2210 may be applied by being combined with the robot 2210*a*, the vehicles 2210*b*-1 and 2210*b*-2, the extended reality (XR) device 2210*c*, the hand-held device 2210*d*, the home appliance 2210*e*, the IoT (Internet of Thing) device 2210*f* through the network (300 in FIG. 22). The robot 2210*a*, vehicles 2210*b*-1 and 2210*b*-2, extended reality (XR) device 2210*c*, hand-held device 2210*d*, home appliance 2210*e*, and IoT (Internet of Thing) device 2210*f* to which the AI technology is applied may be referred to as AI devices.

Hereinafter, examples of AI devices will be described.

The 1st AI Device Example—AI+Robot

An AI technology is applied to the robot 2210*a*, and the robot 2210*a* may be implemented as a guidance robot, a transport robot, a cleaning robot, a wearable robot, an entertainment robot, a pet robot, an unmanned flight robot, etc. The robot 2210*a* may include a robot control module for controlling an operation. The robot control module may mean a software module or a chip in which a software module has been implemented using hardware. The robot 2210*a* may obtain state information of the robot 2210*a*, may detect (recognize) a surrounding environment and object, may generate map data, may determine a moving path and a running plan, may determine a response to a user interaction, or may determine an operation using sensor information obtained from various types of sensors. In this case, the robot 2210*a* may use sensor information obtained by at least one sensor among LIDAR, a radar, and a camera in order to determine the moving path and running plan.

The robot 2210*a* may perform the above operations using a learning model configured with at least one artificial neural network. For example, the robot 2210*a* may recognize a surrounding environment and object using a learning model, and may determine an operation using recognized surrounding environment information or object information. In this case, the learning model may have been directly trained in the robot 2210*a* or may have been trained in an external device, such as the AI server 400. In this case, the robot 2210*a* may directly generate results using the learning model and perform an operation, but may perform an operation by transmitting sensor information to an external device, such as the AI server 400, and receiving results generated in response thereto.

The robot 2210*a* may determine a moving path and running plan using at least one of map data, object information detected from sensor information, or object information obtained from an external device. The robot 2210*a* may run along the determined moving path and running plan by controlling the driving unit. The map data may include object identification information for various objects disposed in the space in which the robot 2210*a* moves. For example, the map data may include object identification information for fixed objects, such as a wall and a door, and movable objects, such as a flowport and a desk. Furthermore, the object identification information may include a name, a type, a distance, a location, etc.

The robot 2210*a* may perform an operation or run by controlling the driving unit based on a user's control/interaction. In this case, the robot 2210*a* may obtain intention information of an interaction according to a user's behavior or voice speaking, may determine a response based on the obtained intention information, and may perform an operation.

The 2nd AI Device Example—AI+Self-Driving

An AI technology is applied to the self-driving vehicle (2210*b*-1, 2210*b*-2), and the self-driving vehicle (2210*b*-1, 2210*b*-2) may be implemented as a movable type robot, a vehicle, an unmanned flight body, etc. The self-driving vehicle (2210*b*-1, 2210*b*-2) may include a self-driving control module for controlling a self-driving function. The self-driving control module may mean a software module or a chip in which a software module has been implemented using hardware. The self-driving control module may be included in the self-driving vehicle (2210*b*-1, 2210*b*-2) as an element of the self-driving vehicle 100*b*, but may be configured as separate hardware outside the self-driving vehicle 100*b* and connected to the self-driving vehicle (2210*b*-1, 2210*b*-2).

The self-driving vehicle (2210*b*-1, 2210*b*-2) may obtain state information of the self-driving vehicle (2210*b*-1, 2210*b*-2), may detect (recognize) a surrounding environment and object, may generate map data, may determine a moving path and running plan, or may determine an operation using sensor information obtained from various types of sensors. In this case, in order to determine the moving path and running plan, like the robot 2210*a*, the self-driving vehicle (2210*b*-1, 2210*b*-2) may use sensor information obtained from at least one sensor among LIDAR, a radar and a camera. Particularly, the self-driving vehicle (2210*b*-1, 2210*b*-2) may recognize an environment or object in an area whose view is blocked or an area of a given distance or more by receiving sensor information for the environment or object from external devices, or may directly receive recognized information for the environment or object from external devices.

The self-driving vehicle (2210b-1, 2210b-2) may perform the above operations using a learning model configured with at least one artificial neural network. For example, the self-driving vehicle (2210b-1, 2210b-2) may recognize a surrounding environment and object using a learning model, and may determine the flow of running using recognized surrounding environment information or object information. In this case, the learning model may have been directly trained in the self-driving vehicle (2210b-1, 2210b-2) or may have been trained in an external device, such as the AI server 400. In this case, the self-driving vehicle (2210b-1, 2210b-2) may directly generate results using the learning model and perform an operation, but may perform an operation by transmitting sensor information to an external device, such as the AI server 400, and receiving results generated in response thereto.

The self-driving vehicle (2210b-1, 2210b-2) may determine a moving path and running plan using at least one of map data, object information detected from sensor information or object information obtained from an external device. The self-driving vehicle (2210b-1, 2210b-2) may run based on the determined moving path and running plan by controlling the driving unit. The map data may include object identification information for various objects disposed in the space (e.g., road) in which the self-driving vehicle (2210b-1, 2210b-2) runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle (2210b-1, 2210b-2) may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

The 3rd AI Device Example—AI+XR

An AI technology is applied to the XR device 2230c, and the XR device 2230c may be implemented as a head-mount display, a head-up display provided in a vehicle, television, a mobile phone, a smartphone, a computer, a wearable device, home appliances, a digital signage, a vehicle, a fixed type robot or a movable type robot. The XR device 2230c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 2230c may output an XR object, including additional information for a recognized object, by making the XR object correspond to the corresponding recognized object.

The XR device 2230c may perform the above operations using a learning model configured with at least one artificial neural network. For example, the XR device 2230c may recognize a real object in three-dimensional point cloud data or image data using a learning model, and may provide information corresponding to the recognized real object. In this case, the learning model may have been directly trained in the XR device 2230c or may have been trained in an external device, such as the AI server 400. In this case, the XR device 2230c may directly generate results using a learning model and perform an operation, but may perform an operation by transmitting sensor information to an external device, such as the AI server 400, and receiving results generated in response thereto.

The 4th AI Device Example—AI+Robot+Self-Driving Vehicle

An AI technology and a self-driving technology are applied to the robot 2210a, and the robot 2210a may be implemented as a guidance robot, a transport robot, a cleaning robot, a wearable robot, an entertainment robot, a pet robot, an unmanned flight robot, etc. The robot 2210a to which the AI technology and the self-driving technology have been applied may mean a robot itself having a self-driving function or may mean the robot 2210a interacting with the self-driving vehicle (2210b-1, 2210b-2). The robot 2210a having the self-driving function may collectively refer to devices that autonomously move along a given flow without control of a user or autonomously determine a flow and move. The robot 2210a and the self-driving vehicle (2210b-1, 2210b-2) having the self-driving function may use a common sensing method in order to determine one or more of a moving path or a running plan. For example, the robot 2210a and the self-driving vehicle (2210b-1, 2210b-2) having the self-driving function may determine one or more of a moving path or a running plan using information sensed through LIDAR, a radar, a camera, etc.

The robot 2210a interacting with the self-driving vehicle (2210b-1, 2210b-2) is present separately from the self-driving vehicle (2210b-1, 2210b-2), and may perform an operation associated with a self-driving function inside or outside the self-driving vehicle (2210b-1, 2210b-2) or associated with a user got in the self-driving vehicle (2210b-1, 2210b-2). In this case, the robot 2210a interacting with the self-driving vehicle (2210b-1, 2210b-2) may control or assist the self-driving function of the self-driving vehicle (2210b-1, 2210b-2) by obtaining sensor information in place of the self-driving vehicle (2210b-1, 2210b-2) and providing the sensor information to the self-driving vehicle (2210b-1, 2210b-2), or by obtaining sensor information, generating surrounding environment information or object information, and providing the surrounding environment information or object information to the self-driving vehicle (2210b-1, 2210b-2).

The robot 2210a interacting with the self-driving vehicle (2210b-1, 2210b-2) may control the function of the self-driving vehicle (2210b-1, 2210b-2) by monitoring a user got in the self-driving vehicle (2210b-1, 2210b-2) or through an interaction with a user. For example, if a driver is determined to be a drowsiness state, the robot 2210a may activate the self-driving function of the self-driving vehicle (2210b-1, 2210b-2) or assist control of the driving unit of the self-driving vehicle (2210b-1, 2210b-2). In this case, the function of the self-driving vehicle (2210b-1, 2210b-2) controlled by the robot 2210a may include a function provided by a navigation system or audio system provided within the self-driving vehicle (2210b-1, 2210b-2), in addition to a self-driving function simply.

The robot 2210a interacting with the self-driving vehicle (2210b-1, 2210b-2) may provide information to the self-driving vehicle (2210b-1, 2210b-2) or may assist a function outside the self-driving vehicle (2210b-1, 2210b-2). For example, the robot 100a may provide the self-driving vehicle (2210b-1, 2210b-2) with traffic information, including signal information, as in a smart traffic light, and may automatically connect an electric charger to a filling inlet through an interaction with the self-driving vehicle (2210b-1, 2210b-2) as in the automatic electric charger of an electric vehicle.

The 5th AI Device Example—AI+Robot+XR

An AI technology and an XR technology are applied to the robot 2210a, and the robot 2210a may be implemented as a guidance robot, a transport robot, a cleaning robot, a wearable robot, an entertainment robot, a pet robot, an unmanned flight robot, a drone, etc. The robot 2210a to which the XR technology has been applied may mean a robot, that is, a target of control/interaction within an XR image. In this case, the robot 2210a is different from the XR device 2210c, and they may operate in conjunction with each other.

When the robot 2210a, that is, a target of control/interaction within an XR image, obtains sensor information from sensors including a camera, the robot 2210a or the XR device 2210c may generate an XR image based on the sensor information, and the XR device 2210c may output the generated XR image. Furthermore, the robot 2210a may operate based on a control signal received through the XR device 2210c or a user's interaction. For example, a user may identify a corresponding XR image at timing of the robot 2210a, remotely operating in conjunction through an external device, such as the XR device 2210c, may adjust the self-driving path of the robot 2210a through an interaction, may control an operation or driving, or may identify information of a surrounding object.

The 6th AI Device Example—AI+Self-Driving Vehicle+XR

An AI technology and an XR technology are applied to the self-driving vehicle (2210b-1, 2210b-2), and the self-driving vehicle (2210b-1, 2210b-2) may be implemented as a movable type robot, a vehicle, an unmanned flight body, etc. The self-driving vehicle (2210b-1, 2210b-2) to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 2210c, and they may operate in conjunction with each other.

The self-driving vehicle (2210b-1, 2210b-2) equipped with the means for providing an XR image may obtain sensor information from sensors including a camera, and may output an XR image generated based on the obtained sensor information. For example, the self-driving vehicle (2210b-1, 2210b-2) includes an HUD, and may provide a passenger with an XR object corresponding to a real object or an object within a screen by outputting an XR image. In this case, when the XR object is output to the HUD, at least some of the XR object may be output with it overlapping a real object toward which a passenger's view is directed. In contrast, when the XR object is displayed on a display included within the self-driving vehicle (2210b-1, 2210b-2), at least some of the XR object may be output so that it overlaps an object within a screen. For example, the self-driving vehicle (2210b-1, 2210b-2) may output XR objects corresponding to objects, such as a carriageway, another vehicle, a traffic light, a signpost, a two-wheeled vehicle, a pedestrian, and a building.

When the self-driving vehicle (2210b-1, 2210b-2), that is, a target of control/interaction within an XR image, obtains sensor information from sensors including a camera, the self-driving vehicle (2210b-1, 2210b-2) or the XR device 2210c may generate an XR image based on the sensor information. The XR device 2210c may output the generated XR image. Furthermore, the self-driving vehicle (2210b-1, 2210b-2) may operate based on a control signal received through an external device, such as the XR device 2210c, or a user's interaction.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although a method for performing an uplink transmission and reception in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method performed by a user equipment (UE) in a wireless communication system, the method comprising:
   transmitting, to a base station (BS), capability information;
   receiving, from the BS, configuration information,
   wherein a transmission scheme related to a physical uplink shared channel (PUSCH) is configured as a codebook based (CB) transmission or a non-codebook based (NCB) transmission based on the configuration information;
   receiving, from the BS, downlink control information (DCI) for scheduling the PUSCH; and
   transmitting, to the BS, the PUSCH based on multiple panels,
   wherein, based on the transmission scheme related to the PUSCH being configured as the NCB transmission, i) Sounding Reference Signal (SRS) resource sets and ii) one or more SRS resources in each of the SRS resource sets are indicated based on the DCI,
   wherein each of the SRS resource sets is related to each of the multiple panels,
   wherein the capability information includes information related to the NCB transmission, and
   wherein, based on the information related to the NCB transmission, a maximum number of SRS resources in one SRS resource set related to simultaneous transmission with the multiple panels is determined.

2. The method of claim 1, wherein the multiple panels include i) at least one first panel and ii) at least one second panel.

3. The method of claim 1, wherein the at least one first panel is based on a first panel type related to a single antenna and the at least one second panel is based on a second panel type related to multiple antennas.

4. The method of claim 3, wherein the first panel type is a preset default panel type for the simultaneous transmission.

5. A user equipment (UE) configured to operate in a wireless communication system, the UE comprising:
   at least one transceiver;
   at least one processor; and
   at least one memory operably connected to the at least one processor and storing instructions for performing operations when executed by the at least one processor,
   wherein the operations comprise:
   transmitting, to a base station (BS), capability information;
   receiving, from the BS, configuration information, wherein a transmission scheme related to a physical uplink shared channel (PUSCH) is configured as a codebook based (CB) transmission or a non-codebook based (NCB) transmission based on the configuration information;
   receiving, from the BS, downlink control information (DCI) for scheduling the PUSCH; and
   transmitting, to the BS, the PUSCH based on multiple panels,
   wherein, based on the transmission scheme related to the PUSCH being configured as the NCB transmission, i) Sounding Reference Signal (SRS) resource sets and ii) one or more SRS resources in each of the SRS resource sets are indicated based on the DCI,
   wherein each of the SRS resource sets is related to each of the multiple panels,
   wherein the capability information includes information related to the NCB transmission, and
   wherein, based on the information related to the NCB transmission, a maximum number of SRS resources in one SRS resource set related to simultaneous transmission with the multiple panels is determined.

6. The UE of claim 5, wherein the multiple panels include i) at least one first panel and ii) at least one second panel.

7. The UE of claim 5, wherein the at least one first panel is based on a first panel type related to a single antenna and the at least one second panel is based on a second panel type related to multiple antennas.

8. The UE of claim 7, wherein the first panel type is a preset default panel type for the simultaneous transmission.

9. A base station configured to operate in a wireless communication system, the base station comprising:
   at least one processor; and
   at least one memory operably connected to the at least one processor and storing instructions for performing operations when executed by the at least one processor,
   wherein the operations comprise:
   receiving, from a user equipment (UE), capability information;
   transmitting, to the UE, configuration information, wherein a transmission scheme related to a physical uplink shared channel (PUSCH) is configured as a codebook based (CB) transmission or a non-codebook based (NCB) transmission based on the configuration information;
   transmitting, to the UE, downlink control information (DCI) for scheduling the PUSCH; and
   receiving, from the UE, the PUSCH based on multiple panels,
   wherein, based on the transmission scheme related to the PUSCH being configured as the NCB transmission, i) Sounding Reference Signal (SRS) resource sets and ii) one or more SRS resources in each of the SRS resource sets are indicated based on the DCI,
   wherein each of the SRS resource sets is related to each of the multiple panels,
   wherein the capability information includes information related to the NCB transmission, and
   wherein, based on the information related to the NCB transmission, a maximum number of SRS resources in one SRS resource set related to simultaneous transmission with the multiple panels is determined.

* * * * *